United States Patent
Jin et al.

(10) Patent No.: US 12,473,350 B2
(45) Date of Patent: Nov. 18, 2025

(54) RECOMBINANT HUMANIZED TYPE III COLLAGEN MICROSPHERE WITH INNOVATIVE SPATIAL STRUCTURE, AND DESIGN, PREPARATION PROCESS AND USE THEREOF

(71) Applicant: Nanjing Tzone Biotechnology Co., Ltd., Nanjing (CN)

(72) Inventors: Yu Jin, Nanjing (CN); Lin Xu, Nanjing (CN); Nianqin Xu, Nanjing (CN); Jinbiao Lu, Nanjing (CN); Dongwu Zhang, Nanjing (CN); Songquan Xu, Nanjing (CN); Kaijin Chang, Nanjing (CN); Mouzhi Liu, Nanjing (CN); Yuan Jiang, Nanjing (CN)

(73) Assignee: Nanjing Tzone Biotechnology Co., Ltd., Nanjing (CN)

( * ) Notice: Subject to any disclaimer, the term of this patent is extended or adjusted under 35 U.S.C. 154(b) by 0 days.

(21) Appl. No.: 18/984,347

(22) Filed: Dec. 17, 2024

(65) Prior Publication Data
US 2025/0206807 A1    Jun. 26, 2025

(30) Foreign Application Priority Data
Dec. 22, 2023    (CN) .......................... 202311780528.0

(51) Int. Cl.
C07K 14/78    (2006.01)
C12N 15/70    (2006.01)
C12P 21/02    (2006.01)

(52) U.S. Cl.
CPC .............. *C07K 14/78* (2013.01); *C12N 15/70* (2013.01); *C12P 21/02* (2013.01)

(58) Field of Classification Search
CPC .......... C07K 14/78; C12N 15/70; C12P 21/02
See application file for complete search history.

(56) References Cited

U.S. PATENT DOCUMENTS

| | | |
|---|---|---|
| 6,992,172 B1 | 1/2006 | Chang et al. |
| 2014/0163205 A1 | 6/2014 | Russell et al. |

FOREIGN PATENT DOCUMENTS

| | | |
|---|---|---|
| CN | 109289088 A | 2/2019 |
| CN | 109593126 A | 4/2019 |
| CN | 111363029 A | 7/2020 |
| CN | 112321723 A | 2/2021 |
| CN | 113185612 A | 7/2021 |
| CN | 115804864 A | 3/2023 |
| CN | 116836263 A | 10/2023 |
| CN | 116888272 A | 10/2023 |
| CN | 117024569 A | 11/2023 |
| CN | 117510619 A | 2/2024 |
| WO | 02051351 A2 | 7/2002 |
| WO | 2010021822 A2 | 2/2010 |

OTHER PUBLICATIONS

Notice of Allowance, Chinese Application No. CN202311780528.
Hoi-Ling Wong, Ming-Xi Wang, Pik-To Cheung, Kwok-Ming Yao, Barbara Pui Chan: a 3D collagen microsphere culture system for GDNF-secreting HEK293 cells with enhanced protein productivity; 12 pages; Received Jun. 14, 2007; Accepted Aug. 9, 2007.
Fan Meng-Qi, Li Xiang, Wei Shao-Min; Application of fermentation technology from the perspectives of skin microbiome and cosmetics; Proya Cosmetics Co., Ltd., Hangzhou, Zhejiang 310063, China; 4 pages.
Yu, Chi-Hua, et al., "ColGen: An end-to-end deep learning model to predict thermal stability of de novo collagen sequences", Journal of the Mechanical Behavior of Biomedical Materials, vol. 125, Jan. 2022, 104921, https://doi.org/10.1016/j.jmbbm.2021.104921.
Wang, Jing, et al., "Characterization of recombinant humanized collagen type III and its influence on cell behavior and phenotype", Journal of Leather Science and Engineering, vol. 4, article No. 33, (2022), https://link.springer.com/article/10.1186/s42825-022-00103-5.
Written Opinion of the International Searching Authority for International application No. PCT/CN2024/133355 dated Mar. 4, 2025.

*Primary Examiner* — Iqbal H Chowdhury
(74) *Attorney, Agent, or Firm* — Jacob M. Ward; Ward Law Office LLC

(57) ABSTRACT

The present application discloses a recombinant humanized type III collagen microsphere with innovative spatial structure, and its design, preparation process, and use. The gene sequence of humanized type III collagen is designed and constructed, and cut by a cutting enzyme and then cyclized by cyclase, obtaining the recombinant humanized type III collagen microspheres with an innovative spatial structure, without introducing any foreign insertion gene or modification gene. The collagen microsphere of the present application exhibits a long degradation time and good stability and durability and can exert its various biological effects for a long time, which can better adapt to applications in the pharmaceutical and cosmetics industries.

12 Claims, 7 Drawing Sheets
Specification includes a Sequence Listing.

```
                        SEQUENCE LISTING

Sequence total quantity: 8
SEQ ID NO: 1            moltype = AA  length = 72
FEATURE                 Location/Qualifiers
source                  1..72
                        mol_type = protein
                        organism = synthetic construct
SEQUENCE: 1
GERGAPGFRG PAGPNGIPGE KGPAGERGAP GPAGPRGERG APGFRGPAGP NGIPGEKGPA  60
GERGAPGPAG PR                                                     72

SEQ ID NO: 2            moltype = AA  length = 36
FEATURE                 Location/Qualifiers
source                  1..36
                        mol_type = protein
                        organism = synthetic construct
SEQUENCE: 2
GIPGEKGPAG ERGAPGPAGP RGERGAPGFR GPAGPN                            36

SEQ ID NO: 3            moltype = DNA  length = 114
FEATURE                 Location/Qualifiers
source                  1..114
                        mol_type = other DNA
                        organism = synthetic construct
SEQUENCE: 3
ggcatccccg gcgagaaggg ccccgccggc gagaggggcg ccccggccc cgccggcccc   60
aggggcgaga ggggcgcccc cggcttcagg ggccccgccg gccccaacca cgtg        114

SEQ ID NO: 4            moltype = AA  length = 53
FEATURE                 Location/Qualifiers
source                  1..53
                        mol_type = protein
                        organism = synthetic construct
SEQUENCE: 4
MBPHHHHHHE NLYFQGIPGE KGPAGERGAP GPAGPRGERG APGFRGPAGP NHV         53

SEQ ID NO: 5            moltype = AA  length = 38
FEATURE                 Location/Qualifiers
source                  1..38
                        mol_type = protein
                        organism = synthetic construct
SEQUENCE: 5
GIPGEKGPAG ERGAPGPAGP RGERGAPGFR GPAGPNHV                          38

SEQ ID NO: 6            moltype = AA  length = 72
FEATURE                 Location/Qualifiers
source                  1..72
                        mol_type = protein
                        organism = synthetic construct
SEQUENCE: 6
GIPGEKGPAG ERGAPGPAGP RGERGAPGFR GPAGPNGIPG EKGPAGERGA PGPAGPRGER  60
GAPGFRGPAG PN                                                     72
```

```
SEQ ID NO: 7             moltype = DNA  length = 1495
FEATURE                  Location/Qualifiers
source                   1..1495
                         mol_type = other DNA
                         organism = synthetic construct
SEQUENCE: 7
cccgcgaaat taatacgact cactataggg gaattgtgag cggataacaa ttcccctcta  60
gaaataattt tgtttaactt taagaaggag ataccatg ggatccatcc gtgatgattt   120
tctgcgtctg ccgagccagg caagcaaatt tttccaggca gatgataatg ttgaaggcac  180
ccgttgggca gttctggttg caggtagcaa aggttatgtt aattatcgtc atcaggccga  240
tgtttgtcat gcatatcaga ttctgaaaaa aggtggcctg aaagacgaaa acatcatcgt  300
gtttatgtat gatgatatcg cctacaatga aagcaatccg catccgggtg ttattatcaa  360
tcatccgtat ggttccgatg tgtataaagg tgttccgaaa gattatgtgg gcgaagatat  420
taatccgcct aactttatg cagttctgct ggcaaataaa agcgcactga ccggcaccgg  480
tagcggtaaa gttctggata gcggtccgaa tgatcacgtg ttcatctatt ataccgatca  540
tggtggtgcc ggtgttctgg gtatgccgag caaaccgtat attgcagcaa gcgatctgaa  600
tgacgtgctg aaaaaaaac atgcaagcgg cacctataaa agcattgtgt tttatgttga  660
aagctgcgaa agcggcagca tgtttgatgg tctgctgccg gaagatcata acatttatgt  720
gatgggtgca agcgataccg gtgaaagcag ctgggttacc tattgtccgc tgcagcatcc  780
gagtccgcct ccggaatatg atgtttgtgt tggtgacctg tttagcgttg catggctgga  840
agattgtgat gttcataatc tgcagaccga aacctttcag cagcagtatg aagttgtgaa  900
aaacaaaacc attgtggccc tgattgaaga tggcacccat gttgttcagt atggtgatgt  960
tggtctgagc aaacagaccc tgtttgttta tatgggcacc gatccggcaa atgataacaa  1020
taccttacc gataaaaaca gcctgggtac accgcgtaaa gcagttagcc agcgtgatgc  1080
agatctgatt cattattggg aaaaatatcg tcgtgcaccg gaaggtagca gccgtaaagc  1140
cgaagcaaaa aaacagctgc gtgaagttat ggcacatcgt atgcatattg ataacagcgt  1200
gaaacatatt ggcaaactgc tgtttggtat cgagaaaggt cataaaatgc tgaataatgt  1260
tcgtccggca ggtctgccgg ttgttgatga ttgggattgt ttcaaaaccc tgattcgtac  1320
ctttgaaacc cattgtggta gcctgagcga atatggtatg aaacacatgc gtagctttgc  1380
caatctgtgt aatgcaggta ttcgcaaaga acaaatggcg gaagcaagcg cacaggcatg  1440
tgttagcatt ccggataatc cgtggtcaag cctgcatgcc ggttttagcg tttaa         1495

SEQ ID NO: 8             moltype = AA  length = 36
FEATURE                  Location/Qualifiers
source                   1..36
                         mol_type = protein
                         organism = synthetic construct
SEQUENCE: 8
GERGAPGFRG PAGPNGIPGE KGPAGERGAP GPAGPR                              36
```

RECOMBINANT HUMANIZED TYPE III COLLAGEN MICROSPHERE WITH INNOVATIVE SPATIAL STRUCTURE, AND DESIGN, PREPARATION PROCESS AND USE THEREOF

CROSS-REFERENCE TO RELATED APPLICATION

This application claims priority to Chinese Patent Application No. 202311780528.0, filed on Dec. 22, 2023, which is hereby incorporated by reference in its entirety.

TECHNICAL FIELD

The present application relates to the field of biotechnology, and in particular, to a recombinant humanized type III collagen microsphere with innovative spatial structure, and design, preparation process, and use thereof.

SEQUENCE LISTING

A sequence listing is submitted electronically herewith and is incorporated herein by reference (filename: cnblusp2429471-SEQL2.xml, date created: Jan. 7, 2025, file size 10 kilobytes). The Sequence Listing submitted is part of the specification and is herein incorporated by reference in its entirety.

BACKGROUND

A type III collagen (Type III Collagen) is a subtype of the collagen family and constitutes a significant component of connective tissue of human body. The type III collagen, as a structural protein, is responsible for providing elasticity and support to the skin, bones, muscles, and other tissues. It has been demonstrated that the type III collagen hydrolysates exhibit notable bioactivities, including antioxidant, antihypertensive, and lipid-lowering effects, as well as damaged skin repair. Furthermore, the type III collagen hydrolysates possess a biocompatibility that surpasses that of other macromolecular materials, leading to its widespread application in the pharmaceutical and cosmetic industries.

Traditional methods of obtaining collagen primarily entail the extraction from animal tissues, for example skin, bones, and hooves and other tissues of animals such as bovines and swine. However, collagen derived from animal sources has certain potential risks. Animal tissues may harbor some pathogens, including bacteria, viruses, and other microorganisms. If there is no sufficient sterilization and testing during extraction and processing, such pathogens may exist in the resultant collagen products. If such collagen products are used, it is possible to lead to the risk of suffering from related diseases, such as Bovine Spongiform Encephalopathy (BSE). Furthermore, collagen derived from animals may elicit immune or allergic response, and certain person is allergic to animal protein. Accordingly, it is not suitable for use in a person that is allergic to animal-derived collagen product.

Genetic engineering technology is the one that employs molecular biology and genetics to modify or recombine the genes of organisms. The development of this technology has enabled the comprehensive development and application of recombinant humanized type III collagen, not only circumventing the potential risks of animal-derived collagen but also ensuring that the preparation process conforms to requirements for safety and quality standards. The currently available recombinant humanized type III collagen is generated through the cloning of the gene encoding type III collagen from human genes, followed by introduction of said gene into genetically modified bacteria for fermentation expression, and subsequent extraction via purification means. Studies indicate that the molecular structure of type III collagen consists of three helical polypeptide chains arranged in a specific manner, forming a linear triple-helix configuration. Especially, the collagen domain of fibroblast collagen is composed of long and uninterrupted triple helices. Primary structure analysis indicates that a fairly long section sequence of the polypeptide chains of type III collagen consists of repeated amino acid sequences of Gly-x-y, where x is typically proline and y is typically hydroxyproline or hydroxylysine. This tripeptide repetitive sequence plays a significant role in the structural integrity of collagen. Hydroxyproline and hydroxylysine are rarely found in other proteins. The hydroxyl group of hydroxyproline can participate in the formation of hydrogen bonds between chains, facilitating the establishment of the triple-helix structure and providing the collagen with good stability within cells. However, the linear triple-helix structure exposes the two ends of type III collagen to the external environment, which allows degrading enzymes easier access to the peptide chain structure, thereby leading to its degradation. Furthermore, during the fermentation expression of engineering bacteria and subsequent extraction and purification processes, the difference between the intracellular and extracellular environments can also predispose recombinant humanized type III collagen to degradation or denaturation. In comparison to the intracellular environment, the extracellular environment exhibits higher oxygen concentration, different temperatures, and different ionic concentrations and PH levels. Glycine (Gly), hydroxyproline (HyPro) and hydroxylysine (HyLys) constitute the type III collagen that are each the amino acid that is prone to oxidation. When exposed to higher oxygen concentration, these amino acids are prone to undergoing an oxidative reaction, which further damages the interchain hydrogen bonds and compromises the stability of the helix structure of type III collagen, resulting in a decline in overall performance, including its bioactivity. Moreover, high temperature and ionic concentration and pH level of environment may also affect the stability of hydrogen bonds and the helical structure, leading to collagen denaturation and degradation. Consequently, the existing recombinant humanized type III collagen always has the problem of poor stability and easiness for degradation.

Protein cyclization refers to the chemical or biological methods used to convert the linear structure of a protein into a cyclic structure. Through cyclization, the stability, anti-degradability, and bioactivity of the protein can be enhanced; at the same time, novel protein conformations can be created to fit in with specific research or application requirements. A commonly employed method for protein cyclization involves the introduction of a linker enzyme to connect the N-terminus and C-terminus of a protein, thereby forming a circular structure. For instance, Chinese patent application CN116888272A discloses a method for the tandem ligation and cyclization of polypeptide, which provides sufficient orthogonality for the tandem ligation and cyclization of protein using enzymes with Asx-specific ligase and cyclization enzyme activities (e.g., butelase-1, VyPAL2, and OaAEP1b). However, for the type III collagen, the introduction of excess components may affect its original functions and activities. Particularly, in the pharmaceutical and cosmetic fields, there are stringent requirements on the definition for the recombinant humanized type III collagen, which should be devoid of any foreign insertion gene or modification gene. The existing enzymatic ligation and cyclization methods are evidently unsuitable for its cyclization.

Therefore, how to achieve the cyclization of recombinant humanized type III collagen, and enhance its stability, anti-degradability and bioactivity, while creating novel protein conformations to better accommodate applications in the pharmaceutical and cosmetic industries, remains a problem worthy of further exploration.

SUMMARY

In response to the aforementioned issues of poor stability and susceptibility to degradation of existing recombinant humanized type III collagen, as well as the unsuitability of existing protein enzyme serial methods for cyclization of recombinant humanized type III collagen, the present application provides a recombinant humanized type III collagen microsphere with innovative spatial structure and design, preparation process and use thereof. Designing and constructing the gene sequence of humanized type III collagen, and cyclizing after being cleaved by a cutting enzyme and a cyclase, obtains a recombinant humanized type III collagen microsphere having an innovative spatial structure without the introduction of any foreign insertion gene or modification gene. The specific technical solution is as follows.

Firstly, one of the objectives of the present application is to provide a recombinant humanized type III collagen microsphere with innovative spatial structure, and the collagen microsphere is formed only by the cyclization of peptide segments having an amino acid sequence that 100% cover the amino acid sequences of natural human type III collagen, the amino acid sequences of the collagen microsphere being as shown in SEQ NO: 1.

SEQ NO: 1
GERGAPGFRGPAGPNGIPGEKGPAGERGAPGPAGPRGERGAPGFRGPAG
PNGIPGEKGPAGERGAPGPAGPR, (72 amino acids).

The aforementioned recombinant humanized type III collagen microsphere with innovative spatial structure has a particle size ranging from 7 to 8 nanometers and is specifically formed by the cyclization of two peptide segments as represented by SEQ NO: 2, which are connected hand-to-tail.

SEQ NO: 2
GIPGEKGPAGERGAPGPAGPRGERGAPGFRGPAGPN,
(36 amino acids).

The second objective of the present application is to provide a design method for the recombinant humanized type III collagen microsphere with innovative spatial structure, involving designing the gene sequence of humanized type III collagen and constructing an expression vector and cutting with Tobacco Etch Virus (TEV) cutting enzyme and cyclizing with Butelase ligase, which results in obtaining a novel recombinant humanized type III collagen microsphere without the introduction of any foreign insertion gene or modification gene. The specific steps are as follows:

S1: designing a humanized type III collagen gene sequence for cyclization based on an amino acid sequence of existing human type III collagen, the humanized type III collagen gene sequence being represented in SEQ NO: 3;

SEQ NO: 3
5'-GGCATCCCCGGCGAGAAGGGCCCCGCCGGCGAGAGGGGCGCCCCCG
GCCCCGCCGGCCCCAGGGGCGAGAGGGGCGCCCCCGGCTTCAGGGGCCC
CGCCGGCCCCAACCACGTG-3';

S2: selecting a pET28a plasmid as an expression backbone, taking MBP-His6 as a plasmid tag, designing a specific target-protein sequence ENLYFQ based on the designed humanized type III collagen gene sequence, and constructing to obtain an expression vector pET28a-MBP-His6-ENLYFQ;

S3: inserting the humanized type III collagen gene sequence designed in step S1 into a specific target-protein gene sequence of the expression vector constructed in step S2 to obtain a recombinant plasmid containing a target protein gene; introducing the recombinant plasmid into an engineering bacterium for cultivation and induction expression; and obtaining a target protein, the target protein having an amino acid sequence as shown in SEQ NO: 4, namely: MBP-His6-ENLYFQ-GIPGEKGPAGERGAPGPAGPRGER-GAPGFRGPAGP-NH V;

S4: subjecting the target protein obtained from step S3 to enzymatic digestion treatment with TEV cutting enzyme and obtaining peptide segments capable of being cyclized, an amino acid sequence of each peptide segment being shown in SEQ NO: 5; namely: GIPGEKGPAGERGAPGPAGPRGERGAPG-FRGPAGP-NHV;

S5: subjecting two peptide segments obtained by enzymatic digestion in step S4 to enzyme ligation reaction using Butelase ligase, and obtaining a cyclic protein formed by hand-to-tail connection of two amino acids G and N, namely, the recombinant humanized type III collagen microsphere with innovative spatial structure, the cyclic protein having a sequence in SEQ NO: 6, which corresponds to the recombinant humanized type III collagen microsphere with innovative spatial structure as illustrated in SEQ NO: 1;

SEQ NO: 6
GIPGEKGPAGERGAPGPAGPRGERGAPGFRGPAGPNGIPGEKGPAGERG
APGPAGPRGERGAPGFRGPAGPN.

The third objective of the present application is to provide a preparation process for the recombinant humanized type III collagen microsphere with innovative spatial structure. The preparation process provided by the present application actually refers to two kinds of processes.

One kind of processes is "stepwise method", including designing the gene sequence of humanized type III collagen and constructing an appropriate expression vector; inserting the designed gene sequence of humanized type III collagen into the expression vector to form a recombinant plasmid, which is then introduced into an engineering bacterium for fermentation expression; extracting a target protein expressed by the recombinant plasmid, treating it with a suitable cutting enzyme, and performing cyclization with ligase to obtain the recombinant humanized type III collagen microsphere with innovative spatial structure.

The other kind of processes is "one-step method", including designing the gene sequence of humanized type III collagen and constructing an appropriate expression vector;

inserting the designed gene sequence of humanized type III collagen into the expression vector to form a recombinant plasmid; introducing the recombinant plasmid, a cutting enzyme gene and a cyclization enzyme gene into an engineering bacteria for fermentation expression; completing the process of in-vivo expressing a target protein from the recombinant plasmid in the engineering bacteria and subjecting the target protein to enzyme digestion and cyclization, followed by extraction and purification to obtain the recombinant humanized type III collagen microsphere with innovative spatial structure.

That is, the first method "stepwise method" involves introducing the recombinant plasmid containing the gene sequence of humanized type III collagen into the engineering bacteria for fermentation, extracting protein, and then performing enzyme digestion and cyclization treatment to obtain the cyclized humanized type III collagen microsphere; and the second method "one-step method" involves introducing the recombinant plasmid containing the gene sequence of humanized type III collagen and the genes of the cutting enzyme and ligase into the engineering bacteria, realizing direct expression within the engineering bacteria by the "one-step method" to obtain the cyclized humanized type III collagen microsphere.

It should be stated that the design of the gene sequence for humanized type III collagen and the design of the expression vector is not exclusive. Based on the characteristics of amino acid sequence of the selected existing humanized type III collagen, the characteristics of the chosen cutting enzyme, and the characteristics of the ligase used, such design may be made to achieve 100% coverage with amino acid sequence of natural human type III collagen while preserving its functional regions (which possess bioactivity) and achieving cyclization without the introduction of any foreign gene or modification.

In an embodiment, both processes of the present application employ the designed humanized type III collagen gene sequence, as represented in SEQ NO. 3; the constructed expression vector is pET28a-MBP-His6-ENLYFQ; the selected cutting enzyme is Tobacco Etch Virus (TEV) cutting enzyme, and the selected cyclization enzyme is Butelase ligase. The amino acid sequence of the recombinant humanized type III collagen microsphere with innovative spatial structure, prepared under these conditions, is as represented in SEQ NO: 1.

In the preparation process for the aforementioned recombinant humanized type III collagen microsphere with innovative spatial structure, the engineering bacterium includes, but is not limited to, one of *Escherichia coli, Bacillus subtilis* or yeast; in an embodiment, the engineering bacterium is *Escherichia coli*.

In the preparation process for the aforementioned recombinant humanized type III collagen microsphere with innovative spatial structure, the TEV cutting enzyme may be either commercially available or produced by inserting the His-TEVp recombinant protein gene into the pET-21a vector to obtain a recombinant plasmid, which is then introduced into the engineering bacterium for expression.

In the preparation process for the aforementioned recombinant humanized type III collagen microsphere with innovative spatial structure, the Butelase ligase may also be commercially available or obtained by integrating the Butelase ligase gene into the expression site of engineering bacterium for expression. For example, the Butelase ligase gene is designed to have a sequence represented in SEQ NO: 7, and then integrated into the lacZ site of BL21 for expression using Clustered Regularly Interspaced Short Palindromic Repeats (CRISPR)/Cas9 technology.

SEQ NO: 7 cccgcgaaattaatacgactcactatagggaattgtgagcggataacaattcccctctagaaataattttgtttaac tttaagaaggagatataccatgggatccatccgtgatgattttctgcgtctgccgagccaggcaagcaaattttccaggcagatgataatgt tgaaggcacccgttgggcagttctggttgcaggtagcaaaggttatgttattatcgtcatcaggccgatgtttgtcatgcatatcagattctg aaaaaggtggcctgaaagacgaaaacatcatcgtgtttatgtatgatgatatcgcctacaatgaaagcaatccgcatccgggtgttattatc aatcatccgtatggttccgatgtgtataaaggtgttccgaaagattatgtgggcgaagatattaatccgcctaacttttatgcagttctgctg gcaaataaaagcgcactgaccggcaccggtagcggtaaagttctggatagcggtccgaatgatcacgtgttcatctattataccgatcatggt ggtgccggtgttctgggtatgccgagcaaaccgtatattgcagcaagcgatctgaatgacgtgctgaaaaaaaacatgcaagcggcacctat aaaagcattgtgttttatgttgaaagctgcgaaagcggcagcatgtttgatggtctgctgccggaagatcataacatttatgtgatgggtgca agcgataccggtgaaagcagctgggttacctattgtccgctgcagcatccgagtccgcctccggaatatgatgtttgtgttggtgacctgttt agcgttgcatggctggaagattgtgatgttcataatctgcagaccgaaacctttcagcagcagtatgaagttgtgaaaaacaaaaccattgtg gccctgattgaagatggcacccatgttgttcagtatggtgatgttggtctgagcaaacagaccctgtttgtttatatgggcaccgatccggca aatgataacaatacctttaccgataaaaacagcctgggtacaccgcgtaaagcagttagccagcgtgatgcagatctgattcattattgggaa aaatatcgtcgtgcaccggaaggtagcagccgtaaagccgaagcaaaaaaacagctgcgtgaagttatggcacatcgtatgcatattgataac agcgtgaaacatattggcaaactgctgtttggtatcgagaaaggtcataaaatgctgaataatgttcgtccggcaggtctgccggttgttgat gattgggattgtttcaaaaccctgattcgtacctttgaaacccattgtggtagcctgagcgaatatggtatgaaacacatgcgtagctttgcc aatctgtgtaatgcaggtattcgcaaagaacaaatggcggaagcaagcgcacaggcatgtgttagcattccggataatccgtggtcaagcctg catgccggttttagcgtttaa.

In the preparation process for the aforementioned recombinant humanized type III collagen microsphere with innovative spatial structure, the first method, "stepwise method" includes the following steps:

SA1: inoculating the engineering bacterium where the recombinant plasmid is introduced into a culture medium and incubating under shaking at 32-37° C. for 20-24 h to obtain a seed solution of expression bacterium;

SA2: transferring the seed solution of the expression bacterium to a fresh culture medium at an inoculation amount of 5% to 15%, and continuing fermentation at 32-37° C.;

SA3: after a density of the engineering bacterium in a fermentation broth reaches a predetermined concentration, adding an Isopropyl β-D-Thiogalactopyranoside (IPTG) inducer, and inducing a target protein for expression at 37° C.;

SA4: after completion of fermentation expression, collecting the fermentation products, centrifuging to obtain a pellet, performing ultrasonication on ice, and then denaturation and renaturation, and conducting protein purification to obtain a target protein;

SA5: resuspending the obtained target protein in a solution of TEV cutting enzyme, and incubating and conducting an enzymatic digestion reaction under conditions of pH 6.0-9.0 and 29-34° C. to obtain peptide segments capable of being cyclized;

SA6: adding the Butelase ligase to an enzymatically digested protein solution, and conducting enzymatic ligation reaction under pH 5.0 to 7.0 and a reaction temperature of 37 to 45° C., and obtaining cyclized recombinant humanized type III collagen;

SA7: collecting the cyclized recombinant humanized type III collagen for purification, and obtaining the recombinant humanized type III collagen microsphere with innovative spatial structure.

The specific process of the second method "one-step method" includes the following steps:

SB1: introducing the recombinant plasmid containing the designed gene sequence of humanized type III collagen and the TEV cutting gene into the engineering bacterium that has integrated with the Butelase ligase gene; inoculating the engineering bacterium into a culture medium, and incubating under shaking under conditions of 32-37° C. for 20-24 h to obtain a seed solution of expression bacterium;

SB2: transferring the seed solution of the expression bacterium to a fresh culture medium at an inoculation amount of 5% to 15% by volume concentration, and continuing fermentation under conditions of 32-37° C.;

SB3: after a density of the engineering bacterium in a fermentation broth reaches a predetermined concentration, adding IPTG inducer to and inducing target protein for expression at 37° C. and conducting enzymatic digestion and cyclization;

SB4: after completion of fermentation expression, collecting fermentation products, centrifuging to obtain a pellet, performing ultrasonication on ice, and denaturation and renaturation, and conducting protein purification to obtain the recombinant humanized type III collagen microsphere with innovative spatial structure.

In the two preparation processes for the aforementioned recombinant humanized type III collagen microsphere with innovative spatial structure, the culture medium used is M9 medium, specifically composed of 20 g/L of glucose, 10 g/L of sodium chloride, and 20 g/L of ammonium sulfate.

In the two preparation processes for the aforementioned recombinant humanized type III collagen microsphere with innovative spatial structure, the inducer added is IPTG with a concentration ranging from 0.5% to 10%. Furthermore, the concentration of the inducer in the culture system is 0.1 mM to 1 mM; and in the "one-step method", the concentration of IPTG in the culture system is 0.5 mM in an embodiment.

In the two preparation processes for the aforementioned recombinant humanized type III collagen microsphere with innovative spatial structure, the density of the engineering bacterium, as measured by OD600, reaches 0.6 to 0.7 upon the addition of the IPTG inducer.

In addition, the fourth objective of the present application is to provide an application for the recombinant humanized type III collagen microsphere with innovative spatial structure. That is, there is provided an application of the aforementioned recombinant humanized type III collagen microsphere in the preparation of hemostatic materials, bone repair materials, skin repair materials, or medical devices, where the medical devices include Class II medical devices such as dressings, and Class III medical devices such as mesotherapy or filling implant materials.

The innovative aspects and beneficial effects of the present application are as follows.

1) The recombinant humanized type III collagen microsphere of the present application represents a novel protein conformation. Compared to the linear structure of natural human type III collagen, the recombinant humanized type III collagen microsphere of the present application alters the original linear spatial structure of collagen through cyclization, which effectively slows down proteolytic degradation of collagen, enhances its stability and durability, and allows for exerting its various biological efficiencies over an extended period. Consequently, it is better suited for applications in the pharmaceutical and cosmetic industries.

2) The recombinant humanized type III collagen microsphere of the present application possesses a protein sequence that has 100% coverage with sequences of natural human type III collagen, and retains the core functional regions of the collagen without introducing any foreign insertion gene or modification gene, which allows for the promotion of tissue cell proliferation and repair, resulting in enhanced biological activity compared to natural human type III collagen.

3) The recombinant humanized type III collagen microsphere of the present application has a particle size of only 7 to 8 nanometers, allowing for easy penetration through the skin barrier and maximizing its biological efficacy.

4) The recombinant humanized type III collagen microsphere of the present application shows a microsphere protein structure due to its cyclized recombination, possesses a more stable molecular configuration and an extended half-life, thereby being more suitable for applications in products such as drug delivery products and transdermal formulations.

5) The recombinant humanized type III collagen microsphere of the present application also exhibits favorable biological activity and biocompatibility, making them widely applicable in the medical field, such as in the treatment of tissue injuries and repairing of wound, which has significant medical and economic value.

6) In the preparation method of the recombinant humanized type III collagen microsphere of the present application, for the purpose of not introducing any foreign insertion gene or modification gene, the pET28a-MBP- His6-ENLYFQ expression vector is constructed, enabling the insertion of the target gene sequence into the recombinant plasmid for cloning into the engineering bacterium for expression. Moreover, it is realized that the collagen expressed by the engineering bacterium can be cut by the TEV cutting enzyme; after the removal of a tag and other foreign gene, the remaining protein peptide segments retain the core functional regions of collagen, and has 100% coverage with amino acid sequences of natural human type III collagen, fully complying with the definition requirements of the recombinant humanized type III collagen, Type A in China (namely, there is no any foreign insertion gene or modification gene).

7) In the preparation method of the recombinant humanized type III collagen microsphere of the present application, for the purpose of cyclization, the gene of natural human type III collagen is designed, with three amino acids, NHV, being added to the end of its protein sequence, which allows the collagen expressed by the engineering bacterium to be cut by TEV cutting enzyme, resulting in a peptide segment sequence that promotes water solubility and enables head-to-tail ligation. Further, under the action of Butelase ligase, the two amino acids, HV, are removed to perform the G-N ligation, thus achieving a head-to-tail connection. Finally, the cyclized collagen sequence formed by the head-to-tail connection of two peptide segments is obtained, fully complying with the definition requirements of the recombinant humanized type III collagen, Type A, and achieving the effect of the collagen forming a cyclic structure by cyclization, showing a hollow spherical structure in the middle on a 3D spatial structure.

8) In the preparation method of the recombinant humanized type III collagen microsphere of the present application, the designed recombinant humanized type III collagen gene, the TEV cutting enzyme gene, and the Butelase ligase gene are all introduced into the same engineering bacterium for fermentation expression for the first time, achieving the fact that the process of expression, enzymatic cleavage, and cyclization of the target gene is completed during fermentation expression, and realizing the effect of obtaining the recombinant humanized type III collagen microspheres through "one-step method".

9) The present application designs the Butelase ligase gene, and realizes the purpose of introducing it into the engineering bacterium for expression, which lays the foundation for the realization of the "one-step method" for obtaining recombinant humanized type III collagen microsphere.

10) The preparation method of the recombinant humanized type III collagen microsphere of the present application, in which the "one-step method" involves cloning the target gene into the engineering bacteria for expression, enzymatic cleavage and cyclization and the protein obtained by expression can be purified to obtain the final product, is simple in production operation, simplifies the technological process and is more suitable for large-scale industrial production, with good practical value and popularization value.

BRIEF DESCRIPTION OF DRAWINGS

To describe the technical solutions in embodiments of the present application or in the prior art more clearly, the following briefly introduces the accompanying drawings needed for describing the embodiments or the prior art. Apparently, the accompanying drawings in the following description illustrate merely some embodiments of the present application, and persons of ordinary skill in the art may still derive other drawings from these accompanying drawings without creative effort.

DESCRIPTION OF EMBODIMENTS

To make the objectives, technical solutions, and advantages of embodiments of the present application clearer, the following clearly and comprehensively describes the technical solutions in embodiments of the present application with reference to the accompanying drawings in embodiments of the present application. Apparently, the described embodiments are merely a part rather than all embodiments of the present application. All other embodiments obtained by persons of ordinary skill in the art based on embodiments of the present application without creative effort shall fall within the protection scope of the present application.

Example 1

This example is directed to the problems of poor stability and easy degradation of existing linear-structured recombinant humanized type III collagen, as well as the unsuitability of existing protein enzymatic ligation and cyclization methods for cyclization of recombinant type III humanized collagen, and proposes a recombinant humanized type III collagen microsphere with innovative spatial structure, and design, preparation process, and application thereof. By designing the amino acid sequences of existing humanized type III collagen and constructing an appropriate expression vector, the recombinant plasmid can be expressed in an engineering bacterium; and the target protein expressed can be cut by cutting enzymes and cyclization enzymes for cyclization, without introducing any foreign insertion gene or modification gene, thereby obtaining novel recombinant humanized type III collagen microsphere.

The amino acid sequence of the recombinant humanized type III collagen microsphere obtained from this example is as follows:

SEQ NO: 1
GERGAPGFRGPAGPNGIPGEKGPAGERGAPGPAGPRGERGAPGFRG
PAGPNGIPGEKGPAGERGAPGPAGPR.

Figure 1:
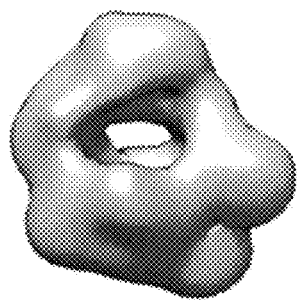
FIG. 1 is a schematic view of a 3D spatial structure of a recombinant humanized type III collagen microsphere with innovative spatial structure according to the present application.

As shown in FIG. 1, the innovative spatial structure of the recombinant humanized type III collagen microsphere consists of 72 amino acids, with a particle size of the microsphere being approximately 7 to 8 nanometers, which represents a brand-new protein conformation, exhibiting a spherical structure with a hollow center in 3D spatial space. In contrast to the linear structure of natural human type III collagen, the recombinant humanized type III collagen microsphere of the present application is a spherical structure formed by cyclization, with the ends of the protein chain being cyclized and closed, which prevents contact with a degrading enzyme, and effectively delays the degradation of collagen by a protease, thereby enhancing its stability and durability, exerting its various biological functions for a long time, and making it better suited for applications in the pharmaceutical and cosmetics industries. For instance, since the cyclization leads to a protein microsphere structure, the recombinant humanized type III collagen microsphere possesses a more stable molecular structure and a longer half-life, making it more suitable for drug delivery and transdermal formulations and other applications.

Furthermore, the amino acid sequence of the innovative spatial structure of the recombinant humanized type III collagen microsphere described in this example achieves 100% coverage with amino acid sequences of natural human type III collagen, retains the core functional regions of the collagen, and does not introduce any foreign insertion gene or modification gene, thereby keeping all the functions of natural type III collagen, while exhibiting enhanced biological activity compared to natural human type III collagen and facilitating the proliferation and repair of tissue cells. Additionally, since the particle size of the collagen microsphere is only 7 to 8 nanometers, it readily passes through the skin barrier, maximizing its biological efficacy. Moreover, the collagen microsphere described in this example possesses good biological activity and biocompatibility, which is similar to natural type III collagen, so that it can be widely used in the medical field, such as treatment of tissue injuries and trauma repair, thus having significant medical and economic values.

The recombinant humanized type III collagen microsphere with innovative spatial structure described in this example is specifically formed from two peptide segments that are linked hand-to-tail and cyclized, each peptide segment including 36 amino acids. The amino acid sequence is as follows:

SEQ NO: 2
GIPGEKGPAGERGAPGPAGPRGERGAPGFRGPAGPN.

For the achievement of such cyclization effect, this example also provides a design method for the recombinant humanized type III collagen microsphere with innovative spatial structure. In this example, the design of the gene sequence of humanized type III collagen and the construction of expression vector are based on the use of Tobacco Etch Virus (TEV) cutting enzyme for cleavage and Butelase ligase for cyclization, obtaining the recombinant humanized type III collagen microsphere with innovative spatial structure without introducing any exogenous insertion gene or modification gene. The method specifically includes the following steps.

S1: Design of the Gene Sequence of Humanized Type III Collagen

The humanized type III collagen acid sequence for cyclization is designed based on an amino acid sequence of existing human type III collagen, which is as follows:

SEQ NO: 3
5'-GGCATCCCCGGCGAGAAGGGCCCCGCCGGCGAGAGGGGCGCCCCCG
GCCCCGCCGGCCCCAGGGGCGAGAGGGGCGCCCCCGGCTTCAGGGGC
CCCGCCGGCCCCAACCACGTG-3'.

S2: Construction of an Expression Vector

Figure 2:
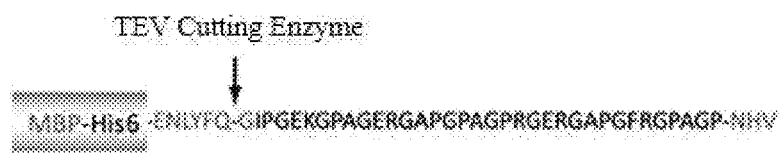
FIG. 2 is a schematic view of a TEV cutting enzyme of the present application for enzymatic digestion of a target protein.

For the purpose of not introducing any exogenous insertion gene or modification gene, in this example, a pET28a plasmid is selected as an expression backbone, taking MBP-His6 as a plasmid tag, as illustrated in FIG. 2. Furthermore, based on the designed sequence of humanized type III collagen, namely, the characteristics of the selected cutting enzyme and cyclization enzyme, the specific target-protein sequence ENLYFQ is designed and the expression vector pET28a-MBP-His6-ENLYFQ is obtained by construction.

S3: Recombination and Expression

After inserting the humanized type III collagen gene designed in step S1 into the specific target-protein gene of the expression vector constructed in step S2, a recombinant plasmid containing a target protein gene is obtained; and the recombinant plasmid is introduced into an engineering bacterium for cultivation and induction expression to obtain a target protein, the target protein having an amino sequence as shown in SEQ NO: 4, specifically as follows:

MBP-His6-ENLYFQ-GIPGEKGPAGER-
GAPGPAGPRGERGAPGFRGPAGP-NHV.

S4: Enzymatic Digestion

The target protein obtained from step S3 is subjected to enzymatic digestion treatment using TEV cutting enzyme to excise an exogenous gene such as tag to obtain peptide segment capable of being cyclized, and an amino acid sequence of each peptide segment is shown in SEQ NO: 5, specifically as follows:

GIPGEKGPAGERGAPGPAGPRGERGAPGFRGPAGP-
NHV.

S5: Cyclization

Figure 3:
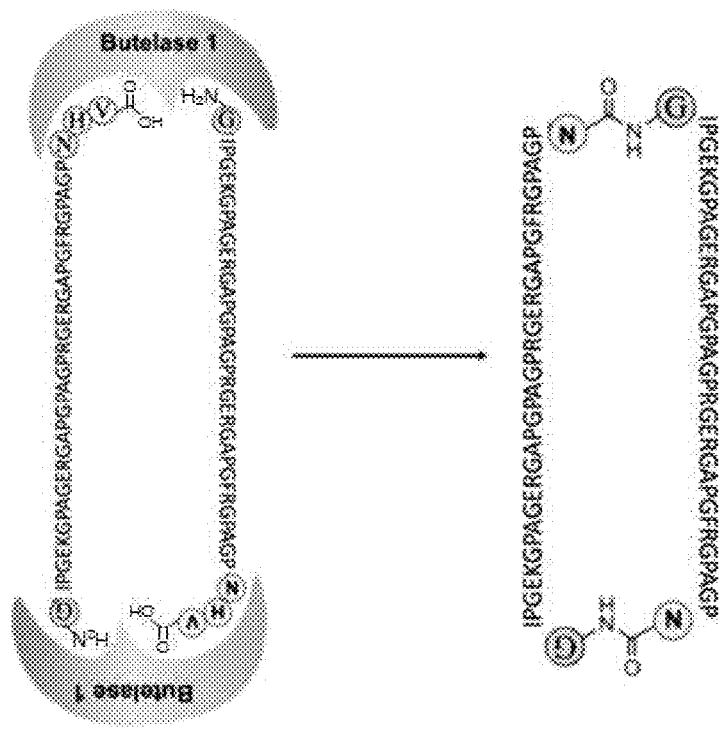
FIG. 3 is a schematic view of a cyclization process of the recombinant humanized type III collagen with innovative spatial structure according to the present application.

The two peptide segments, obtained by digestion in step S4, are subjected to an enzyme ligation reaction using Butelase ligase, and the two amino acids of HV are removed, yielding a cyclic protein formed by the respective head-to-tail connections of amino acids G-N, as shown in FIG. 3. The amino acid sequence of the obtained cyclic protein is as follows:

SEQ NO: 6
GIPGEKGPAGERGAPGPAGPRGERGAPGFRGPAGPNGIPGEKGPAGERGA
PGPAGPRGERGAPGFRGAGPN.

That is, the obtained cyclic protein is the recombinant humanized type III collagen microsphere with innovative spatial structure, as represented by SEQ NO: 1.

Of course, the design method of this example is merely one of many possible methods and does not exclude the use of other methods, as long as they can achieve 100% coverage with amino acid sequence of natural human type III collagen, retain its functional regions (which possess biological activity) and accomplish the purpose of cyclization without introducing any exogenous gene or modification.

In addition, in order to obtain the recombinant humanized type III collagen microsphere with innovative spatial structure, this example also provides two preparation processes. The first process is a stepwise method, which includes introducing the recombinant plasmid containing the gene sequence of humanized type III collagen into the engineering bacteria for fermentation, extracting the protein, and then performing enzymatic digestion and cyclization treatment to obtain the cyclized humanized type III collagen microsphere. The second process involves introducing the recombinant plasmid containing the gene sequence of humanized type III collagen along with the genes for the cutting enzyme and ligase into the engineering bacterium, achieving a "one-step method" for direct expression in the engineering bacterium to obtain the cyclized humanized type III collagen microsphere. Namely:

"Stepwise method": designing the gene sequence of humanized type III collagen and constructing an appropriate expression vector; inserting the designed gene sequence of humanized type III collagen into the expression vector to form a recombinant plasmid, which is then introduced into an engineering bacterium for fermentation expression; extracting a target protein expressed by the recombinant plasmid, treating with a suitable cutting enzyme, and performing cyclization with ligase to obtain the recombinant humanized type III collagen microsphere with innovative spatial structure;

"One-step method": designing the gene sequence of humanized type III collagen and constructing an appropriate expression vector; inserting the designed gene sequence of humanized type III collagen into the expression vector to form a recombinant plasmid; introducing the recombinant plasmid, a cutting enzyme gene and a cyclization enzyme gene into an engineering bacterium for fermentation expression; completing the process of in-vivo expressing a target protein from the recombinant plasmid in the engineering bacterium and subjecting the target protein to enzyme digestion and cyclization, followed by extraction and purification to obtain the recombinant humanized type III collagen microsphere with innovative spatial structure.

It should be stated that the design of the gene sequence for humanized type III collagen and the design of the expression vector is not exclusive. Based on the characteristics of amino acid sequence of the selected existing humanized type III collagen, the characteristics of the chosen cutting enzyme, and the characteristics of the ligase used, such design may be made to achieve 100% coverage with amino acid sequences of natural human type III collagen while preserving its functional regions (which possess bioactivity) and achieving cyclization purpose without the introduction of any foreign gene or modification. As an example, the designed humanized type III collagen gene sequence in this example is as shown in SEQ NO: 3; the constructed expression vector is pET28a-MBP-His6-ENLYFQ; the cutting enzyme is TEV cutting enzyme; and the cyclization enzyme is Butelase ligase. The resulting amino acid sequence of the recombinant humanized type III collagen microsphere with innovative spatial structure is as shown in SEQ NO: 1. In other examples, those skilled in the art may conduct similar designs from the inspiration of the present application, such as replacement of cutting enzyme and construction of corresponding expression vector.

The specific preparation process of the "stepwise method" in this example specifically includes the following steps:

SA1: inoculating the engineering bacterium where the recombinant plasmid is introduced into a culture medium and incubating under shaking at 32-37° C. for 20-24 h to obtain a seed solution of the expression bacterium;

SA2: transferring the seed solution of the expression bacterium to a fresh culture medium at an inoculation amount of 5% to 15% by volume concentration, and continuing fermentation at 32-37° C.;

SA3: after a density of the engineering bacterium in a fermentation broth reaches a predetermined concentration, adding an IPTG inducer, and inducing target protein for expression at 37° C.;

SA4: after completion of fermentation expression, collecting fermentation products to obtain a pellet, performing ultrasonication on ice, and then denaturation and renaturation, and conducting protein purification to obtain a target protein;

SA5: resuspending the obtained target protein in a solution of TEV cutting enzyme, and incubating and conducting an enzymatic digestion reaction under conditions of pH 6.0-9.0 and 29-34° C. to obtain peptide segments capable of being cyclized;

SA6: adding the Butelase ligase to an enzymatically digested protein solution, conducting enzymatic ligation under conditions of pH 5.0-7.0 and a reaction temperature of 37-45° C., and obtaining cyclized recombinant humanized type III collagen;

SA7: collecting the cyclized recombinant humanized type III collagen for purification, and obtaining the recombinant humanized type III collagen microsphere with innovative spatial structure.

The process of the "one-step method" in this example specifically includes the following steps:

SB1: introducing a recombinant plasmid containing the designed gene sequence of humanized type III collagen and a recombinant plasmid containing the TEV cutting gene into an engineering bacterium that has integrated with the Butelase ligase gene; inoculating the engineering bacterium into a culture medium, and incubating under shaking at 32-37° C. for 20-24 h to obtain a seed solution of expression bacterium;

SB2: transferring the seed solution of the expression bacterium to a fresh culture medium at an inoculation amount of 5% to 15% by volume concentration, and continuing fermentation at 32-37° C.;

SB3: after a density of the engineering bacterium in a fermentation broth reaches a predetermined concentration, adding IPTG inducer to and inducing expression of the target protein at 37° C. and performing enzyme digestion and cyclization;

SB4: after completion of fermentation expression, collecting fermentation products, centrifuging to obtain a pellet, performing ultrasonication on ice, and then denaturation and renaturation, and conducting protein purification to obtain the recombinant humanized type III collagen microsphere with innovative spatial structure.

In the two preparation processes for the recombinant humanized type III collagen microsphere with innovative spatial structure, the culture medium used is not exclusive; the suitable medium may be selected based on cultivation requirements. The inducer used is also not exclusive and may be added according to particular experiments, provided that it can effectively induce the expression of the designed target protein.

In this example, the culture medium used is M9 medium, which has the specific composition of 20 g/L of glucose, 10 g/L of sodium chloride, and 20 g/L of ammonium sulfate. The inducer added is IPTG, with a concentration range of 0.5% to 10%. When adding the IPTG inducer, the density of the engineering bacteria is controlled to achieve an OD600 of 0.6 to 0.7. Furthermore, the concentration of the inducer in the culture system is 0.1 mM to 1 mM. In the "one-step method", the concentration of IPTG in the culture system is 0.5 mM, thereby facilitating better expression of both the recombinant plasmid containing the designed humanized type III collagen gene sequence and the recombinant plasmid containing the TEV cutting gene, and achieving the goal of in-vivo cleavage and cyclization.

For the preparation process for the recombinant humanized type III collagen microsphere with innovative spatial structures described in this example, the engineering bacteria used include, but are not limited to, any of *Escherichia coli, Bacillus subtilis*, or yeast. For example, in one example, the recombinant plasmid may be transformed into *E. coli* BL21 (DE3) competent cells via heat shock. In other examples, other engineering bacteria may be employed, with the main purpose of achieving the fermentation expression of the recombinant plasmid.

It is to be noted that in the process for the preparation of the recombinant type III humanized collagen microsphere with innovative spatial structure described in this example, the TEV cutting enzyme used can be purchased from the market or obtained by inserting the His-TEVp recombinant protein gene into the pET-21a vector to obtain a recombinant plasmid, which is then introduced into an engineering bacterium for expression. The Butelase ligase used may also be purchased from the market, or obtained by integrating the gene of Butelase ligase into the expression site of the engineering bacterium for expression. However, it should be clarified that Butelase ligase is a new class of Asx-specific peptide ligase from butterfly pea, and such enzyme is capable of efficiently cyclizing non-native polypeptides from various organisms. However, this enzyme has only been demonstrated to achieve high efficiency for terminal ligation of amino acid cyclic chains to form a cyclic peptide in plants, and no studies have been reported on its cloning for fermentation expression in the engineering bacteria and protein cyclization. To achieve the integration of the Butelase ligase into the expression site of the engineering bacteria, this example also designs its gene sequence. The designed nucleotide sequence is represented as SEQ NO: 7; and then integrated into the lacZ site of BL21 through Clustered Regularly Interspaced Short Palindromic Repeats (CRISPR)/Cas9 technology.

SEQ NO: 7

```
cccgcgaaattaatacgactcactatagggggaattgtgagcggataacaattcccctctagaaataattttgtttaac tttaagaaggagatataccatgggatccatccgtgatgattttctgcgtctgccgagccaggcaagcaaattttccaggcagatgataatgt tgaaggcacccgttgggcagttctggttgcaggtagcaaaggttatgttaattatcgtcatcaggccgatgtttgtcatgcatatcagattct gaaaaaggtggcctgaaagacgaaaacatcatcgtgtttatgtatgatgatatcgcctacaatgaaagcaatccgcatccgggtgttattat caatcatccgtatggttccgatgtgtataaaggtgttccgaaagattatgtgggcgaagatattaatccgcctaactttatgcagttctgct ggcaaataaaagcgcactgaccggcaccggtagcggtaaagttctggatagcggtccgaatgatcacgtgttcatctattataccgatcatgg tggtgccggtgttctgggtatgccgagcaaaccgtatattgcagcaagcgatctgaatgacgtgctgaaaaaaaacatgcaagcggcaccta taaaagcattgtgttttatgttgaaagctgcgaaagcggcagcatgtttgatggtctgctgccggaagatcataacatttatgtgatgggtgc aagcgataccggtgaaagcagctgggttacctattgtccgctgcagcatccgagtccgcctccggaatatgatgtttgtgttggtgacctgtt tagcgttgcatggctggaagattgtgatgttcataatctgcagaccgaaacctttcagcagcagtatgaagttgtgaaaaacaaaaccattgt ggccctgattgaagatggcacccatgttgttcagtatggtgatgttggtctgagcaaacagaccctgtttgtttatatgggcaccgatccggc aaatgataacaataccttaccgataaaaacagcctgggtacaccgcgtaaagcagttagccagcgtgatgcagatctgattcattattggga aaaatatcgtcgtgcaccggaaggtagcagccgtaaagccgaagcaaaaaaacagctgcgtgaagttatggcacatcgtatgcatattgataa cagcgtgaaacatattggcaaactgctgtttggtatcgagaaaggtcataaaatgctgaataatgttcgtccggcaggtctgccggttgttga tgattgggattgtttcaaaaccctgattcgtaccctttgaaacccattgtggtagcctgagcgaatatggtatgaaacatgcgtagctttgc caatctgtgtaatgcaggtattcgcaaagaacaaatggcggaagcaagcgcacaggcatgtgttagcattccggataatccgtggtcaagcct gcatgccggttttagcgtttaa.
```

The expression vector containing the cutting enzyme gene described in this example can be obtained by insertion of the His-TEVp recombinant protein gene into the pET-21a vector. In other examples, other vectors capable of expressing active TEV cutting enzyme in the engineering bacteria may also be utilized.

In this Example, the protein collection and purification procedure is as follows: after the completion of fermentation expression, the fermentation product is collected, and the precipitate is collected through centrifugation and then subjected to sonication on ice, followed by denaturation and renaturation for protein purification. Specifically, the centrifugation conditions are as follows: 4° C., 6000-10000 r/min, and centrifugation for 15-30 min, and the bacteria cells are collected by centrifugation. The bacterium pellet is resuspended in a lysis solution, and a proteinase inhibitor mixed solution is added. Breakage is done by sonication on ice. The supernatant is removed by centrifugation, and the insoluble inclusion bodies are resuspended in Triton buffer and incubated at room temperature for 30 minutes. After centrifugation, the supernatant is discarded, and the pellet is resuspended in the lysis solution containing 6 M urea and incubated overnight to dissolve the protein. The protein is purified using a His-tag nickel column to remove residual tags and other exogenous genes. In other examples, the culture medium and purification method thereof may be employed, with the main purpose of cultivating the engineering bacteria with the aforementioned functionalities to achieve the purpose of fermentation expression and extraction purification.

Finally, this example proposes an application of the recombinant humanized type III collagen microsphere with innovative spatial structure, that is, the use of the above recombinant humanized type III collagen microsphere with innovative spatial structure in pharmaceuticals or cosmetics, including in the preparation of Class II medical devices such as dressings, mesotherapy or Class III medical devices such as filler and implants, hemostatic materials, bone repair and drug delivery carrier materials, or products for sensitive skin repair, and the like.

Example 2

This example employs the "one-step method" to prepare the recombinant humanized type III collagen microsphere with innovative spatial structure as described from Example 1. The engineering bacteria used in this example is *Escherichia coli* BL21 (DE3), and the specific preparation process is as follows.

Step 1: Design of Gene Sequence

The gene sequence of the humanized type III collagen for cyclization is designed based on the amino acid sequence of existing human type III collagen, as shown in SEQ NO: 3. Additionally, the gene sequence of Butelase ligase is also designed, as shown in SEQ NO: 7.

Step 2: Construction of Expression Vector and Engineering Bacterium

Taking the pET28a plasmid as the expression backbone and MBP-His6 as the plasmid tag, the specific target-protein sequence ENLYFQ is designed to construct the expression vector pET28a-MBP-His6-ENLYFQ. After inserting the designed humanized type III collagen gene into the specific target-protein gene of the constructed expression vector pET28a-MBP-His6-ENLYFQ, a recombinant plasmid 1 containing the target protein gene is obtained for later use.

Meanwhile, the His-TEVp recombinant protein gene is inserted into the pET-21a vector to obtain a recombinant plasmid 2 containing the TEV cutting enzyme gene for later use.

Using CRISPR/Cas9 technology, the Butelase ligase gene sequence, as shown in SEQ NO: 7, is integrated to the lacZ site of BL21, followed by performing screening to obtain BL21 cells capable of expressing cyclase for later use.

Step 3: Assembly of Engineering Bacterium for Production

Firstly, the recombinant plasmid 1 containing the target protein gene is transformed into the competent cell of BL21 (DE3) integrated with the Butelase ligase gene through heat shock, and the first generation of recombinant genetically engineered bacterium is obtained by screening; then, the recombinant plasmid 2 containing the TEV cutting enzyme gene is transformed into the first generation recombinant genetically engineered bacterium, and the second generation of recombinant genetically engineered bacterium that can express the recombinant humanized type III collagen microsphere with innovative spatial structure is obtained by further screening, that is, the engineering bacterium for production.

Step 4: Fermentation and Expression

1) Strain cultivation: the engineering bacterium for production that is obtained through assembly and screening is inoculated into a 500 mL triangular flask containing 50 mL of M9 medium, and incubated under shaking at 35° C. and 200 r/min for 24 h to obtain the seed solution of expression bacterium.

2) Transfer and fermentation: the seed solution of the expressed bacterium is transferred to a 10 L shake flask containing 3 L of M9 medium at an inoculum amount of 10% by volume concentration, and kept at 35° C. and 200 r/min for fermentation.

3) Induction expression: after the density of the engineering bacterium in the fermentation broth reaches an OD600 of 0.6, an IPTG inducer is added at a concentration of 2%, where the inducer concentration is 0.5 mM in the culture system, followed by induction of protein expression and cyclization at 37° C. to obtain a fermentation broth containing the recombinant humanized type III collagen microsphere with innovative spatial structure.

Step 5: Extraction and Purification

After the fermentation expression is complete, the fermentation products are collected and centrifuged at 4° C. at 8000 r/min for 20 min to obtain the precipitated bacterium pellet; the bacterium pellet is resuspended in a lysis solution (50 mM phosphate, 300 mM NaCl, 5 mM imidazole, pH 8.0) and a mixture of protease inhibitors (composed mainly of Leupeptin, Pepstatin A, Aprotinin, E-64, etc., without EDTA) is added to the lysis solution, followed by performing sonication on ice. The insoluble inclusion bodies are resuspended in Triton buffer and incubated at room temperature for 30 minutes, and centrifuged to discard the supernatant, the centrifugation conditions being as the above. The obtained pellet is resuspended in a lysis solution containing 6 M urea, and incubated overnight to dissolve the protein. After protein denaturation and renaturation, the protein purification is carried out using a His-tag nickel column. After two chromatographic steps using ionic chromatography column and hydrophobic chromatography column, the recombinant humanized type III collagen microsphere with innovative spatial structure can be obtained, with a purity exceeding 95%, and its amino acid sequence is shown in SEQ NO: 1.

Example 3

This example employs the "stepwise method" to prepare the recombinant humanized type III collagen microsphere with innovative spatial structure as described from Example 1. The engineering bacterium used in this Example is *Escherichia coli* BL21 (DE3), and the specific preparation process is as follows.

Step 1: Design of Gene Sequence

The gene sequence of the humanized type III collagen for cyclization is designed based on the amino acid sequence of existing human type III collagen, as shown in SEQ NO: 3. Additionally, the gene sequence of Butelase ligase is also designed, as shown in SEQ NO: 7.

Step 2: Construction of Expression Vector and Engineering Bacteria

Taking the pET28a plasmid as the expression backbone and MBP-His6 as the plasmid tag, the specific target-protein sequence ENLYFQ is designed to construct the expression vector pET28a-MBP-His6-ENLYFQ. After inserting the designed humanized type III collagen gene into the specific target-protein gene of the constructed expression vector pET28a-MBP-His6-ENLYFQ, a recombinant plasmid 1 containing the target protein gene is obtained for later use.

Meanwhile, the His-TEVp recombinant protein gene is inserted into the pET-21a vector to obtain a recombinant plasmid 2 containing the TEV cutting enzyme gene for later use.

Using CRISPR/Cas9 technology, the Butelase ligase gene sequence, as shown in SEQ NO: 7, is integrated to the lacZ site of BL21, followed by performing screening to obtain BL21 cells capable of expressing cyclase for later use.

Step 3: Assembly of Engineering Bacterium for Production

The recombinant plasmid 1 containing the target protein gene is transformed into the competent cell of BL21 (DE3) through heat shock, and subjected to screening to obtain an engineering bacterium 1 for production of the target protein.

The recombinant plasmid 2 containing the TEV cutting enzyme gene is transformed into another competent cell of BL21 (DE3), and subjected to screening to obtain an engineering bacterium 2 for production of the cutting enzyme.

BL21 integrated with the Butelase ligase gene is used as an engineering bacterium 3 for production of the ligase.

Step 4: Fermentation and Expression

1) Strain cultivation: the three types of engineering bacteria are each inoculated into a 500 mL triangular flask containing 50 mL of M9 medium, and incubated under shaking at 35° C. and 200 r/min for 24 h to obtain the seed solutions 1, 2 and 3 of expression bacterium.
2) Transfer and fermentation: the three seed solutions of the expressed bacteria are each transferred to a 10 L shake flask containing 3 L of M9 medium at an inoculum amount of 10% by volume concentration, and kept at 35° C. and 200 r/min for fermentation.
3) Induction expression: after the density of the engineering bacteria in the fermentation broth reaches an OD600 of 0.6, an IPTG inducer is added at a concentration of 1.5% and protein expression is induced at 37° C. to obtain the crude products containing the target protein, TEV cutting enzyme, and Butelase ligase, respectively.

Step 5: Extraction of Protein

The corresponding fermentation products are collected and purified separately. The specific procedure can refer to the purification method from Example 2, but is not limited to this method; other methods from the prior art may also be considered. After purification, the target protein to be cut, TEV cutting enzyme, and Butelase ligase are obtained for later use.

Step 6: Enzymatic Digestion Treatment

The TEV cutting enzyme is prepared into an enzyme solution with a mass concentration of 10 U/ul, and the target protein to be cut is added at a feed-to-liquid ratio of 3%; the conditions of the enzymatic digestion reaction are controlled as follows: pH 7.4, temperature 30° C., and incubation for 60 min, to obtain peptide segments that can be cyclized.

Step 7: Enzymatic Ligation and Cyclization

The pH of the protein solution after enzymatic digestion is adjusted to 6.0, and the Butelase ligase is added at an amount of 0.03% of the mass of the protein solution; the conditions of the cyclization reaction are controlled as follows: pH 6.0, temperature 42° C., and incubation for 30 min, to obtain the recombinant humanized type III collagen that is cyclized.

Step 8: Collection and Purification

The cyclized recombinant humanized type III collagen is collected for purification, and the method thereof may be referred to, but is not limited to, the extraction and purification method from Example 2. The specific operation is as follows: centrifugation to remove the supernatant, centrifugation at 4° C. and 8000r/min for 20 min, resuspension of the precipitate in the lysis solution containing 6M urea, and overnight incubation to dissolve the protein. After denaturation and refolding, the protein purification is carried out by His-tag nickel column, and after two chromatographic steps using ionic chromatography column and hydrophobic chromatography column, the recombinant humanized type III collagen microsphere with innovative spatial structure can be obtained, and its amino acid sequence is shown in SEQ NO: 1.

The "stepwise method" in this example involves separately introducing the recombinant plasmid 1 and recombinant plasmid 2 into the engineering bacterium for cultivation, and the engineering bacterium integrated with the Butelase ligase gene is also separately cultured, thereby separately obtaining the target protein, TEV cutting enzyme, and Butelase ligase for use. It is not excluded that in other examples, the engineering bacteria producing TEV cutting enzyme and Butelase ligase may be mixed and co-cultivated with the engineering bacterium producing the target protein (including different mixing forms); or, the recombinant plasmid 1, the recombinant plasmid 2, and the engineering bacterium integrated with the Butelase ligase gene may be combined with each other in various ways other than that of Example 2 (including different combination forms) to control experimental conditions and achieve the cutting and enzymatic ligation and cyclization process of the target protein.

Example 4

This example is to verify whether the recombinant humanized type III collagen microsphere with innovative spatial structure has been successfully prepared in Examples 2 and 3.

The verification of this Example includes two experiments. One experiment is to detect the protein products of fermentation expression at various stages through electrophoresis so as to verify whether the recombinant humanized type III collagen is cyclized. The other experiment is to verify through Western blot whether the product obtained from Example 2 is humanized collagen.

The recombinant humanized type III collagen microsphere with innovative spatial structure obtained from Examples 2 and 3 has the amino acid sequence as shown in SEQ NO: 1.

SEQ NO: 1
GERGAPGFRGPAGPNGIPGEKGPAGERGAPGPAGPRGERGAPGFRGPAG
PNGIPGEKGPAGERGAPGPAGPR.

After analysis, the peptide ring represented by this sequence has a molecular weight of 6.68 kDa. Due to the triple helix structure of type III collagen, namely, the resulting protein microsphere product should contain three peptide ring structures, it is predicted that the molecular weight of this protein microsphere will be approximately 18 kDa. The specific verification test is as follows.

I. SDS-PAGE Protein Electrophoresis Experiment

In the experiment, the protein products expressed at respective stages of fermentation are detected by electrophoresis, in order to verify whether the recombinant humanized type III collagen has been expressed and cyclized. In this experiment, two control groups are established, where the fermentation product from the first-generation recombinant genetic engineering bacterium in Example 2 is used as control group 1 to verify whether the constructed recombinant plasmid 1 of the target protein gene can be expressed in the engineering bacterium. The fermentation products from the first-generation recombinant genetic engineering bacterium are divided into IPTG pre-induction product 1-1 and IPTG post-induction product 1-2 for verification, and its post-induction product is recovered and purified. Meanwhile, the purified target protein collected from Example 3 is used for comparison. The culture product 2 from the engineering bacterium that is not integrated with the Butelase ligase gene in Example 2 is used as control group 2, where the recombinant plasmid 1 and recombinant plasmid 2 are introduced into the engineering bacterium, to verify whether the target protein expressed by the recombinant plasmid 1 can be cleaved by the TEV cutting enzyme expressed by the recombinant plasmid 2.

The two control groups have the same plasmid introduction process, engineering bacterium culture method, and protein purification method as in Example 2, except for differences in the plasmid contained in the engineering bacterium and whether the Butelase ligase gene is integrated. The specific experimental process is as follows.

1. Sample processing: each protein sample is collected, and a loading buffer is added to the collected protein sample, mixed evenly, kept on a boiling water bath for 10 min, and cooled naturally for later use.
2. Electrophoresis: using Kingsray SurePAGE™ precast gel (15%), the processed sample is loaded into loading wells, and electrophoresed at 140 V for 50 min until the bromophenol blue bands run to the bottom of the gel.
3. Coomassie Brilliant Blue R-250 (Sangon Biotech (Shanghai) Co., Ltd., A610037) staining with a microwave oven
1) A staining solution is prepared by dissolving Coomassie Brilliant Blue R250 in a solution including 40% ethanol and 10% acetic acid to a final concentration of 0.1% (W/V).
2) A decolorizing solution is prepared by dissolving and mixing ethanol and acetic acid to obtain ethanol with a final concentration of 10% (V/V) and acetic acid with a final concentration of 7.5% (V/V).
3) After the electrophoresis is complete, the gel plate is pried up to remove the gel, and then the gel is placed into a staining container containing 100 mL of staining solution.
4) The staining container is covered with a lid and placed in a microwave oven for heating at high power for 8 min. To avoid hazards, it is careful not to let the solution boil.
5) The staining container is removed from the microwave oven and placed on a decolorizing shaker for gently shaking at normal temperature for 5 min.
6) The staining solution is discarded and the gel is carefully washed with deionized water.
7) The deionized water is discarded and 100 mL of decolorizing solution is added.
8) The container is covered with the lid and placed in a microwave oven for heating at high power for 8 min.
9) The decolorizing solution is discarded, and a fresh decolorizing solution is added, followed by repeating step 8).
10) The container is removed from the microwave oven again and placed on the decolorizing shaker, and gently vibrated at normal temperature until the gel background is clear.

Figure 4:
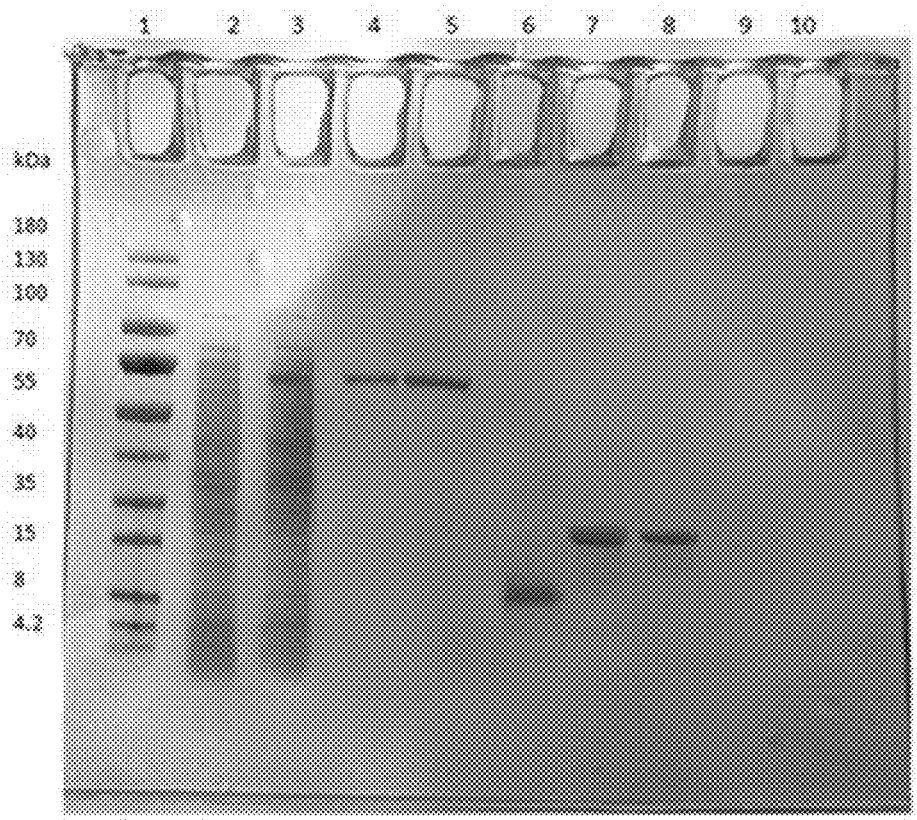
FIG. 4 shows results of protein electrophoresis detection in Example 4 of the present application (in the figure, Lane 1 represents a Marker, Lane 2 represents an IPTG pre-induction product 1-1 of control group 1, Lane 3 represents an IPTG post-induction product 1-2 of control group 1, Lane 4 represents a purified product 1-3 of control group 1 (5 μL of loaded sample), Lane 5 represents a target protein product collected and purified in Example 3 (5 μL of loaded sample), Lane 6 represents a product of control group 2, Lane 7 represents a product extracted and purified in Example 2, and Lane 8 represents the final extracted and purified product in Example 3).

The results are shown in FIG. 4, in which Lane 1 represents a Marker; Lane 2 represents IPTG pre-induction product 1-1 of control group 1; Lane 3 represents IPTG post-induction product 1-2 of control group 1; Lane 4 represents purified product 1-3 of control group 1 (5 µL of loaded sample); Lane 5 represents the target protein product collected and purified from Example 3 (5 µL of loaded sample); Lane 6 represents the product of control group 2; Lane 7 represents the product extracted and purified from Example 2; and Lane 8 represents the final extracted and purified product from Example 3.

It can be seen from the results of the electrophoresis experiment that, compared to the IPTG pre-induction product 1-1 of control group 1, the IPTG post-induction product 1-2 of control group 1 exhibits a significantly enhanced band around 60 kDa. Furthermore, the purified post-induction expression product 1-3 of control group 1 shows a single band with high purity, similar to the target protein induced for expression in Example 3, verifying that the target protein contained in the recombinant plasmid 1 is induced to express specifically. The product 4 from control group 2 shows a protein fragment with a molecular weight of approximately 9 kDa, verifying that the target protein expressed by the recombinant plasmid 1 can be accurately cleaved by TEV cutting enzyme, resulting in the removal of the protein tag and yielding a peptide segment with an amino acid sequence as shown in SEQ NO: 5. The final product obtained from Example 2 and the product after final extraction and purification in Example 3 exhibit a significant increase in band molecular weights, both of which are approximately 18 kDa. This indicates that the peptide segments obtained after cutting by TEV cutting enzyme can be cyclized by the Butelase ligase, and the two peptide segments are indeed cyclized. This validates that both Example 2 and Example 3 successfully produced the recombinant humanized type III collagen with innovative spatial structure, namely, the cyclic protein microsphere with the amino acid sequence as shown in SEQ NO: 1.

II. Western Blot Verification

The present experiment is to verify by Western Blot the final products obtained from Example 2 and Example 3, namely, the recombinant humanized type III collagen microsphere with innovative spatial structure. The detailed experimental procedure is as follows.
1. Protein Transfer Using eBlot™ Rapid Wet Transfer
   1) One piece of filter paper and one piece of Polyvinylidene Difluoride (PVDF) membrane, that have a size similar to that of the electrophoresis gel, are cut with scissors and labelled at one corner of the PVDF membrane with a pencil.
   2) The PVDF membrane is activated with methanol, and then the filter paper and PVDF membrane are soaked in a transfer buffer.
   3) The transfer buffer (Tris 5.8 g, glycine 2.9 g, SDS 0.37 g, methanol 200 mL, and deionized water to a final volume of 1 L) is added to a tray, and then a sponge, the PVDF membrane, the filter paper, and a transfer membrane clamp are placed in the tray.
   4) A sponge is placed on the black plate of the transfer membrane clamp, followed by laying the filter paper and the gel on the black plate. After alignment, any bubbles are removed using a glass rod.
   5) A small amount of transfer buffer is taken with a micropipette and placed on the transferred electrophoresis gel (SDS-PAGE protein electrophoresis gel for the product obtained in Example 2 and the final extracted and purified product in Example 3), followed by laying a PVDF membrane, and then a filter paper and a sponge on the gel; after alignment, air bubbles are driven out with the glass rod.
   6) The transfer membrane clamp is tightened and fixed, and then placed into the transfer membrane fixing apparatus with the black faces facing each other.
   7) The transfer membrane fixing apparatus and an ice box containing ice are placed in a transfer tank; and the transfer tank is filled with transfer buffer.
   8) The power supply is conducted, with a constant voltage being 110 V for 1 h.
2. Blocking and Antibody Incubation
   1) The power supply is turned off, the transfer membrane clamp is opened, and the PVDF membrane is removed and washed with deionized water.
   2) The PVDF membrane is placed in a blocking solution and blocked on a shaker at 37° C. for 1 h.
   3) The blocking solution is discarded, and the PVDF membrane is washed with a Phosphate Buffered Saline with Tween 20 (PBST) buffer and incubated with a primary antibody working solution on the shaker at 37° C. for 1 h.
   4) The primary antibody working solution is discarded, and the incubated PVDF membrane is washed with the PBST buffer and incubated with a secondary antibody working solution on a shaker at 37° C. for 1 h.
   5) The secondary antibody working solution is discarded and the obtained PVDF membrane is washed with the PBST buffer, in which the membrane is washed on a shaker for 4 times, with each wash lasting 5 min.
3. Development and Exposure
   1) A flat paper is used to remove residual liquid from the membrane and then the PVDF membrane is placed flat.
   2) Equal volumes of solution A and solution B of the Enhanced Chemiluminescence (ECL) reagent are taken by a micropipette and placed in an Eppendorf (EP) tube to return to room temperature.
   3) The two solutions are mixed evenly and then applied to the membrane and reacted in the dark for 60 seconds.
   4) The ECL mixture is discarded and the membrane is placed in a dark box for exposure and development, where the exposure time is controlled to approximately 30 seconds.

Figure 5:
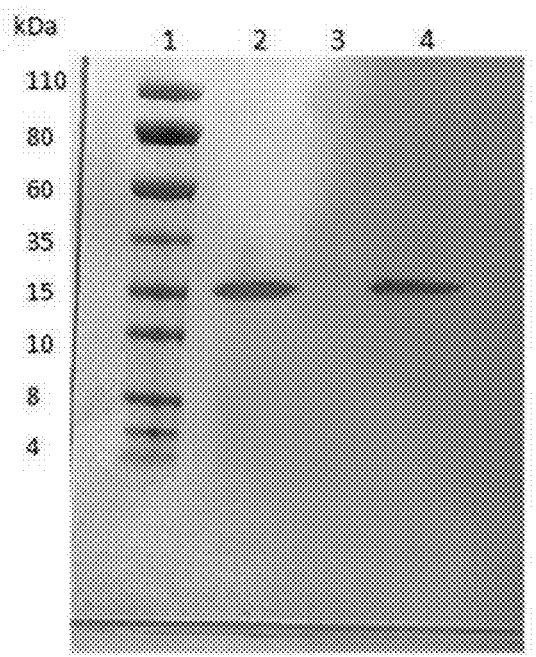
FIG. 5 shows Western Blot validation results in Example 4 of the present application (in the figure, Lane 1 represents a Marker, Lane 2 represents a product obtained in Example 2, and Lane 4 represents a product obtained in Example 3).

The experimental results are shown in FIG. 5, which displays obvious bands near 18 kDa (in the figure, Lane 1 represents the Marker, Lane 2 represents the product obtained from Example 2, and Lane 4 represents the product obtained from Example 3). This indicates that the final protein microsphere products obtained from Examples 2 and 3 are the recombinant humanized type III collagen.

Example 5

This Example is to further detect the spatial structure of the recombinant humanized type III collagen microsphere with innovative spatial structure obtained from Example 2. The specific experimental protocol and results are as follows.
1. Negative Staining Sample Preparation and Observation
1.1. Experimental Method
   1) Sample information: the final collagen product obtained from Example 2 is dissolved in the Phosphate Buffered Saline (PBS) buffer, the sample concentration being 10 mM.
   2) Negative staining sample preparation and observation The protein sample is diluted with the PBS buffer to a concentration of 0.1 mg/mL, 8 µL of diluted protein sample solution is taken to drip onto a glow-discharge treated (15 mA for 90 seconds, PELCO easiGlow™) copper grid and incubated for 40 seconds. After the excess sample is removed, the obtained copper grid is quickly washed once with 0.75% uranium formate, and further incubated for 40 s by dripping 10 µL of 0.75% uranium formate; and then the excess solution is removed, allowing it to air dried.

Figure 6:
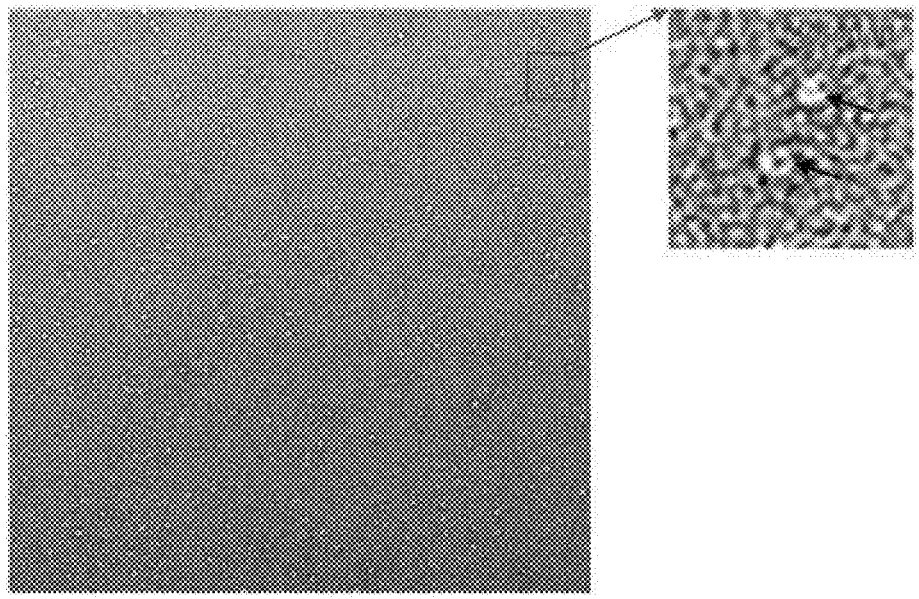
FIG. 6 is a negative staining photograph of a cyclic collagen in Example 5 of the present application.
Figure 7:
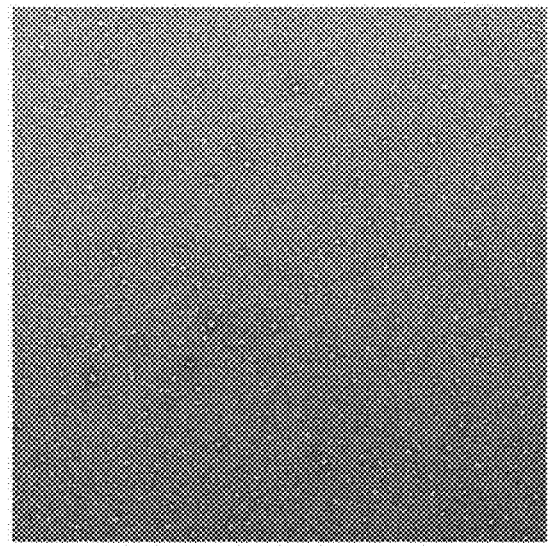
FIG. 7 is one of photographs of negative staining data collected in Example 5 of the present application.
Figure 8:
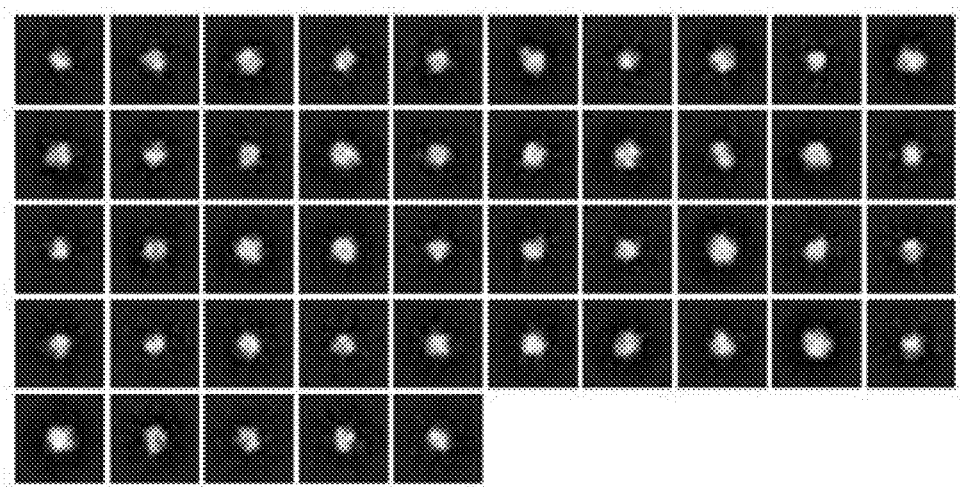
FIG. 8 shows a display of results of 2D classification in Example 5 of the present application.
Figure 9:
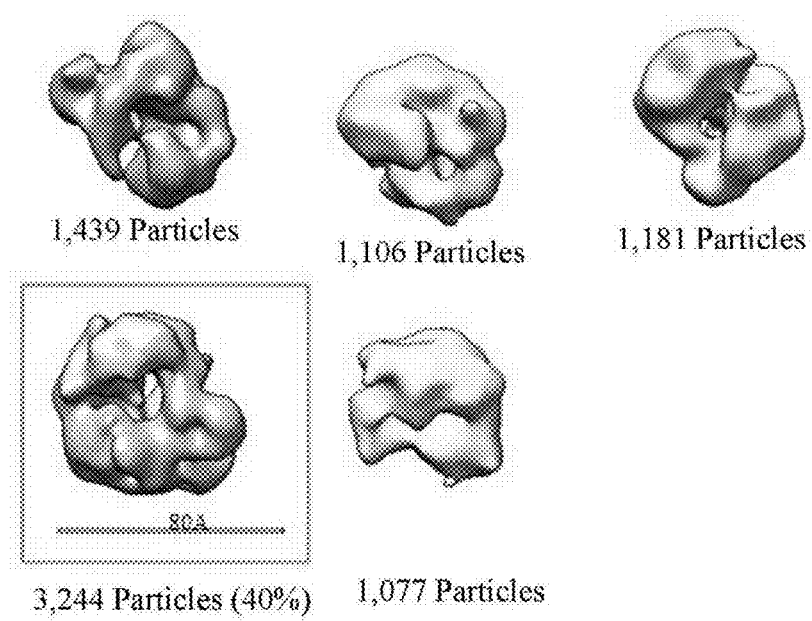
FIG. 9 is a view showing the results of 3D reconstruction in Example 5 of the present application.

The prepared copper grid containing the sample is placed under a Talos 120 electron microscope (Thermo Fisher Scientific, USA) for sample observation at a voltage of 120 kV. Negative staining photographs are captured at a magnification of 92,000× using a Ceta-D camera (Thermo Fisher Scientific, USA), with a pixel size of 1.9 Å/pixel.
1.2. Experimental Results The negative staining results are shown in FIG. 6. As can be seen from the figure, the negative staining photographs of the cyclic collagen display uniform sample particles and no aggregation.
2. 3D Reconstruction of Negative Staining Data
2.1. Data Collection and Processing The negative staining photographs are collected, as shown in FIG. 7, with 60 images in total. The negative staining data are processed using CryoSPARC v4.0.3 version software for two-dimensional (2D) classification, three-dimensional (3D) reconstruction, and 3D classification.
2.2. Results of 2D Classification For the 2D classification of the negative staining data, 45 better classes are selected ultimately, with a total of 8,047 particles, as shown in FIG. 8. These selected particles are used for subsequent 3D reconstruction.
2.3. Results of 3D Reconstruction of Cyclic Collagen The selected particles are first subjected to 3D reconstruction (ab-initio reconstruction), resulting in five classes of 3D reconstruction models (ab-initio models), as shown in FIG. 9. The finally selected 3D density map of the cyclic collagen corresponds to the fourth class (3,244 particles, approximately 40%).

Figure 10:
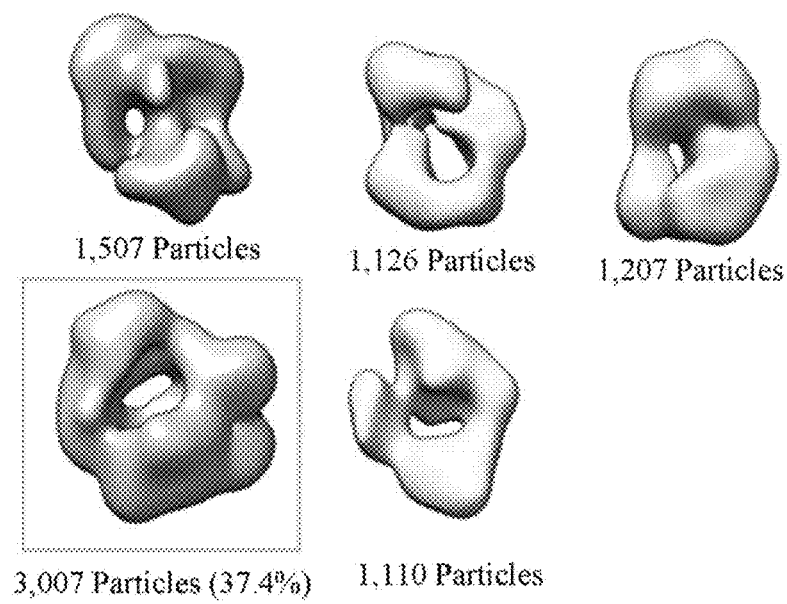
FIG. 10 is a view showing the results of 3D classification in Example 5 of the present application.
Figure 11:
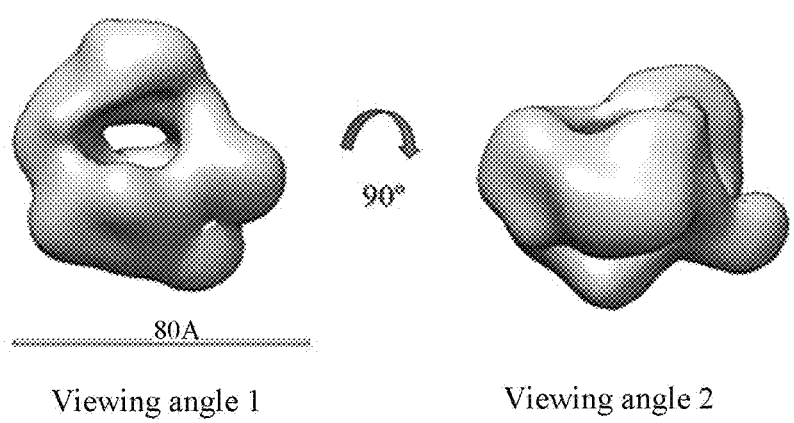
FIG. 11 is a view showing an electron density of the cyclic collagen in Example 5 of the present application, displayed from two viewing angles.
Figure 12:
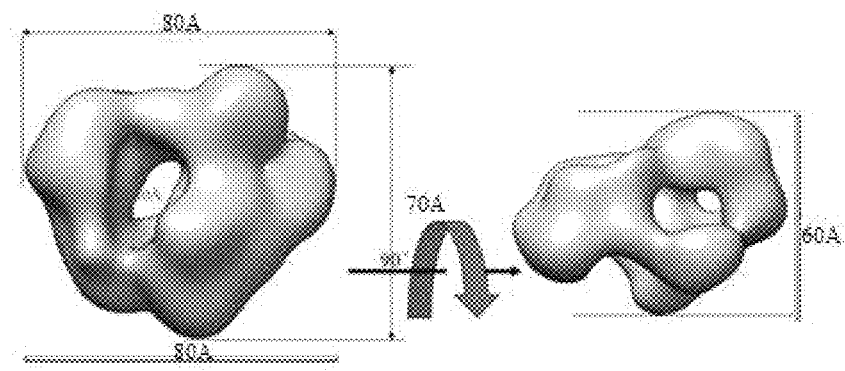
FIG. 12 shows an illustration of diameter measurements in Example 5 of the present application.

Subsequently, 3D classification (i.e., heterogeneous refinement) is performed using the above generated five 3D reconstruction models, with the results shown in FIG. 10. In the figure, there are 3,007 particles corresponding to the selected fourth class of 3D density map of the cyclic collagen, accounting for 37.4%, with a resolution of approximately 13 Å. The electron density map of the cyclic collagen is presented from two viewing angles, namely, its 3D spatial conformation, as shown in FIG. 11; its size measurement results, namely diameter measurements, are displayed in FIG. 12 (in the figure, 10 Å=1 nm).

As can be seen from the verification, the recombinant humanized type III collagen microsphere with innovative spatial structure obtained in Example 2 has a 3D spatial conformation of an annular spherical structure with a diameter of about 7 nm and a pore size of about 3 nm, and the specific spatial conformation is shown in FIG. 1. That is, the recombinant humanized type III collagen microsphere with innovative spatial structure exhibits a spherical structure with a hollow center in the 3D spatial structure.

Example 6

This example utilizes a time-of-flight high-resolution tandem mass spectrometry system to analyze and detect the recombinant humanized type III collagen microsphere with innovative spatial structure obtained from Example 2. The specific preprocessing protocol for the primary structure of amino acid (peptide map) is as follows.

(1) Washing: 100 µL of 50 mM ammonium bicarbonate is added to the 10 kDa ultrafiltration tube for washing.
(2) Solution replacement (replacement of the original storage buffer for sample): the protein product from Example 2 is centrifuged at 16,000 g for 10 min. 5 µL (22 µg/µL) of sample is added, which corresponds to 110 µg of sample, and 95 µL of 7 M guanidine hydrochloride is added, and mixed by vortex followed by centrifugating at 16,000 g to dry.
(3) Denaturation: 100 µL of 7 M guanidine hydrochloride is added.
(4) Reduction: 4 µL of 1 M Dithiothreitol (DTT) is added and kept at 42° C. for 1 h.
(5) 10 µL of 1 M 3-Indoleacetic Acid (IAA) is added, and kept in the dark at room temperature for 30 min.
(6) Centrifugation: 100 µL of 50 mM ammonium bicarbonate is added and centrifuged at 16,000 g for 15 min until dry, which is repeated for three times.
(7) Enzymatic digestion: The sample is mixed with trypsin at a 30:1 (mass ratio) and incubated in a 37° C. oven overnight.
(8) The digested sample is inverted and centrifuged for 1 min, then Formaldehyde (FA) is added to the final concentration of FA in the solution is 1%.
(9) The pretreated sample is analyzed by the time-of-flight mass spectrometry or high-resolution mass spectrometry for amino acid sequence confirmation.

Through detection, it is verified that the amino acid sequence of the recombinant humanized type III collagen microsphere with innovative spatial structure obtained from Example 2 is as follows:

SEQ NO: 8
GERGAPGFRGPAGPNGIPGEKGPAGERGAPGPAGPR.

The collagen obtained has a 100% amino acid coverage with the designed recombinant humanized type III collagen, further validating that the application has successfully synthesized the recombinant humanized type III collagen microsphere with innovative spatial structure, its amino acid sequence as shown in SEQ NO: 1.

Example 7

This example is to conduct a cell biology experiment on the recombinant humanized type III collagen microsphere with innovative spatial structure obtained from Example 2. The specific experimental protocol and results are as follows.

1. Experimental Objectives

The cell biological activity of the recombinant humanized type III collagen microsphere with innovative spatial structure obtained from Example 2 is investigated using the 3-(4,5-Dimethylthiazol-2-yl)-2,5-Diphenyl Tetrazolium Bromide (MTT) assay and cell scratch assay.

2. Experimental Materials

Human skin fibroblasts (HSF cells), high-sugar Dulbecco's Modified Eagle Medium (DMEM) culture medium, Fetal Bovine Serum (FBS), trypsin, PBS, penicillin-streptomycin solution, MTT, Dimethyl Sulfoxide (DMSO), Hoechst 33342 staining solution, bovine serum albumin, multi-channel pipette, pipette tip (5 mL, 1 mL, 200 µL, 10 µL), 96-well plate, centrifugation tube (50 mL, 15 mL, 2 mL), and others.

Test sample: the recombinant humanized type III collagen microsphere with innovative spatial structure obtained from Example 2.

Control sample: lyophilized fibers of commercialized recombinant humanized type III collagen.

3. Experimental Methods 3.1. Solution Preparation

Culture medium preparation: 90% high-sugar DMEM culture medium+10% FBS, with an additional 1% penicillin-streptomycin solution.

MTT solution preparation: a concentration of 5 mg/mL. Specific preparation method is as follows: weighing 0.5 g of MTT and dissolving it in 100 mL of PBS (which may be assisted to dissolve by a 60° C. water bath); sterilizing using a 0.22 µm filter membrane and storing at 4° C. in the dark, where during the preparation and storage process, an aluminum-foil paper is used for wrapping.

PBS formulation: NaCl 8 g, KCl 0.2 g, $Na_2HPO_4$ 1.44 g, $KH_2PO_4$ 0.24 g; where pH is adjusted to 7.4 and a final volume is set to be 1 L.

3.2. Detection Methods (MTT Assay, Cell Scratch Test)

The detection principle of MTT method is that succinate dehydrogenase in live mitochondria cells can reduce exogenous MTT to water-insoluble blue-purple crystalline formazan and deposit it in cells, while dead cells do not have this function. Dimethyl sulfoxide (DMSO) can dissolve formazan in cells, and its light absorption value can be measured at a wavelength of 450 nm using an enzyme-linked immunosorbent assay, which can indirectly reflect the number of live cells. Within a certain range of cell numbers, the amount of MTT crystals formed is proportional to the number of cells.

The principle of scratch test is to draw a line in the cell growth area on a monolayer of adherent cells cultured in vitro in a dish or plate using a micro-pipette tip, suction off the cells in the scratch area, and then continue to culture until the set time (such as 24 hours) to observe whether the peripheral cells have migrated to the central scratch area, in order to determine the growth and migration ability of the cells.

4. Experimental Procedure
4.1. Detection of Cell Growth Activity by MTT Assay

Logarithmic phase cells are collected and the cell suspension concentration is adjusted. 100 μL of cell suspension is added per well and plated to adjust the density of the cells to be tested to 10,000 cells/well, and the edge wells are filled with sterile PBS. The cells are incubated under 5% $CO_2$ at 37° C. until the cell monolayer spreads over all the bottom of the wells. Then, the drug in a concentration gradient is added; in principle, the drug can be added once the cells have adhered, with five parallel settings. The incubation is performed under 5% $CO_2$ at 37° C. for 24 h or 48 h and the cells are observed under an inverted microscope. 20 μL of MTT solution (5 mg/mL, i.e., 0.5% MTT) is added to each well and the incubation is continued for 4 h. If the drug can react with MTT, the culture medium may be discarded after centrifugation, followed by carefully washing 2-3 times with PBS, and then adding the MTT-containing culture solution. The culture is terminated and the culture solution is carefully suctioned out from each well. 150 μL of Dimethyl Sulfoxide (DMSO) is added to each well and the culture plate is placed on a shaker to shake at a low speed for 10 min to fully dissolve the crystals. The light absorption value of each well is measured at OD450 nm using an Enzyme-Linked Immunosorbent Assay (ELISA) reader. Zero wells (culture medium, MTT, DMSO) and negative control wells (cells, drug dissolving medium at the same concentration, culture solution, MTT, DMSO) are set at the same time.

4.2. Investigation of Cell Migration by Cell Scratch Assay

First, a marker is used to draw horizontal lines evenly on the back of a 6-well plate by using a ruler, with a distance between two horizontal lines being approximately 0.5-1 cm, in which each well is crossed by three lines. Approximately 5×105 cells are added to each well and cultured in an incubator. At the next day, the cell growth is observed; once the cells cover the bottom of the wells, a micropipette tip is used to scratch on the plate bottom by aid of the ruler, where the micropipette tip is perpendicular as possible to the horizontal lines on the back. Then, the cells are washed three times with PBS to remove the scratched cells, and the culture medium containing 1% FBS is added. The plate is placed in a 37° C., 5% $CO_2$ incubator for cultivation. After 24 hours, the plate is taken photographs to record the convergence degree of the scratches in each well.

5. Cell Proliferation and Migration Assay

The data of effect of collagen on HSF cell growth is detailed in Table 1.

TABLE 1

Effect of recombinant humanized type III collagen on HSF cell growth

| Groups | Concentration (μg/ml) | RGR (24 h) | RGR (48 h) |
|---|---|---|---|
| | 400 | 112.1% | 139.1% |
| Example 2 | 200 | 105.80% | 123.40% |
| | 100 | 103.90% | 118.20% |
| Control sample | 200 | 113.00% | 136.5% |
| Negative control group | 10% DMSO | 28.20% | 17.15% |
| Normal cell group | 0 | 100.00% | 100.00% |

The experimental results indicate that, under the experimental conditions of the present Example, the recombinant humanized type III collagen microsphere with innovative spatial structure obtained from Example 2 demonstrates a growth-promoting effect on HSF cells at concentrations of 0.01% and 0.02% after 24 h, comparable to the cell proliferation-promoting performance of the commercialized collagen product used as a control.

5.2. The Effect of Recombinant Humanized Type III Collagen Microsphere on HSF Cell Migration is as Follows.

Figure 13:
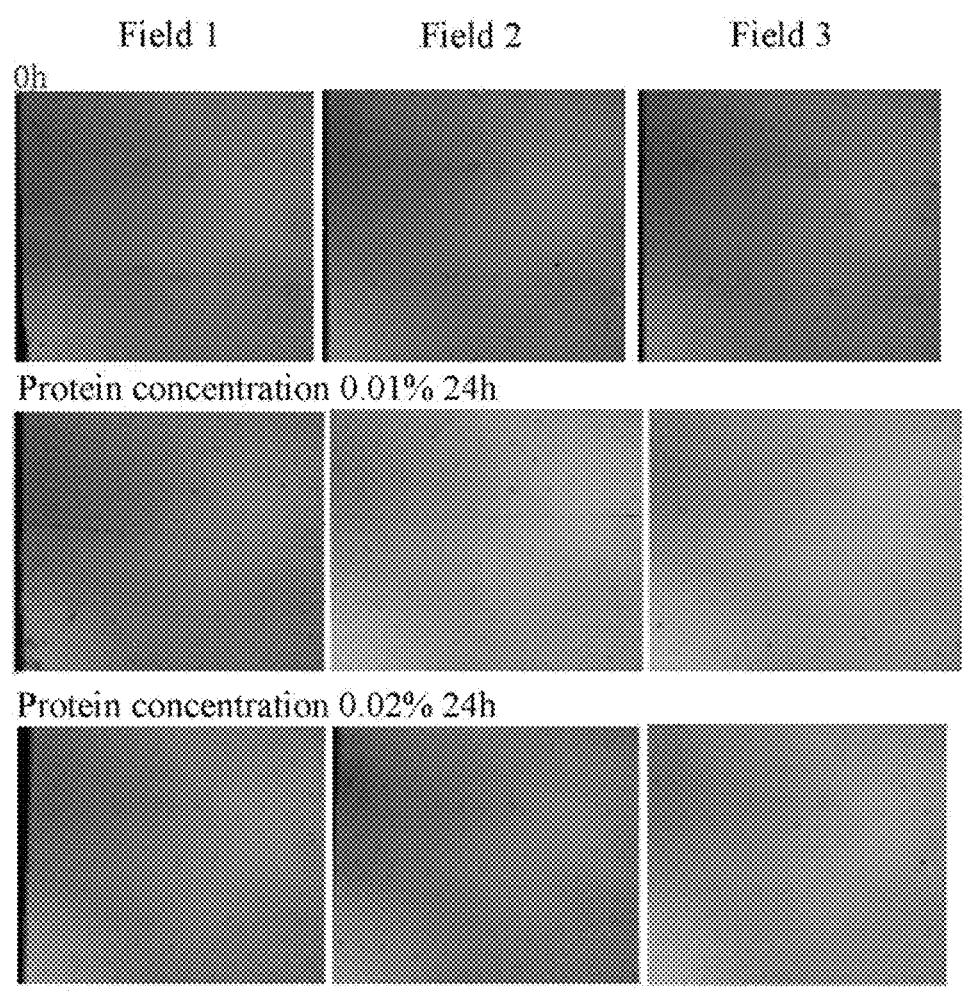
FIG. 13 shows results of the effect of collagen microspheres on Human Skin Fibroblasts (HSF) cell migration in Example 7 of the present application.

This experiment investigates the effect of the recombinant humanized type III collagen microsphere with innovative spatial structure obtained from Example 2 on HSF cell migration, mainly observing the degree of convergence in the scratch area after 24 h of the addition of collagen. The results are obtained by taking three fields at the time of scratching, and then taking three fields for each group after 24 h, and the results are shown in FIG. 13.

The results from the cell scratch test indicate that the recombinant humanized type III collagen microsphere with innovative spatial structure obtained from Example 2 has significant pro-cell migration activity when added at concentrations of 0.01% and 0.02% and observed at 24 h of culture. The migration activity on Human Skin Fibroblasts (HSF) cells indicates that the collagen has a promotional effect on skin repair and wound healing.

Example 8

This example is to explore the in vivo degradability of the recombinant humanized type III collagen microsphere with innovative spatial structure obtained from Example 2. The specific experimental procedure is as follows.

1. Selection of Experimental Animals

Mouse model: C57BL/6J female mice, weighing 20 g per mouse.

2. Grouping of Experimental Animals

The experimental animals are divided into the experimental group, control group, and blank group, with 12 mice in each group, totaling 36 mice. Each group has 3 experiments, with 3 mice per experiment, as detailed in Table 2.

The experimental group receives an injection of recombinant humanized type III collagen microsphere with innovative spatial structure obtained from Example 2, while the control group receives an injection of commercialized recombinant humanized type III collagen lyophilized fiber. Dissection time points are set at 1 d, 14 d, 28 d, and 56 d, with 3 animals dissected at each time point. At the same time, a control group and a blank group are set, totaling 36 animals.

TABLE 2

Effect of recombinant humanized type III collagen on HSF cell growth

| Groups | Number/piece | Drug |
|---|---|---|
| Blank group | 3 × 4 | — |
| Control group | 3 × 4 | Control collagen |
| Experimental group | 3 × 4 | Recombinant humanized type III collagen |

3. Experimental Procedure
3.1. Surgical Operation

1) Weighing: Prior to injection, the weight of the animal is weighed to determine the total injection dosage based on the animal's body weight. Subsequently, the injection volume at each injection site is calculated based on the total injection volume and the number of injection points.

2) The back of an animal is de-haired, and with the spinal column as a midline, one injection area is set on each of the left and right sides of the back, resulting in two injection sites per animal. The product is implanted intradermally in the back, and the injection volume at each injection site is ½ of the total injection volume.

Figure 14:
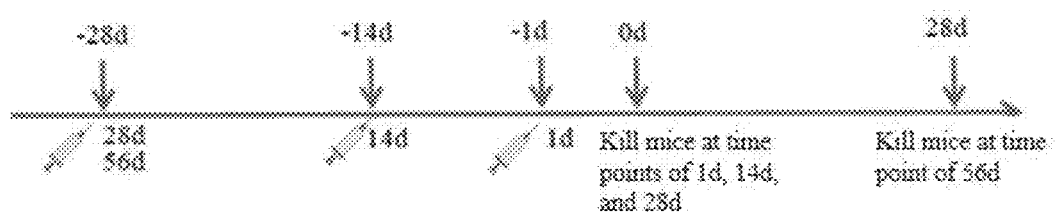
FIG. 14 is a flowchart of injection and kill for collagen microsphere animal experiments in Example 8 of the present application.

Specific procedures: For the 28 d and 56 d time points, injections shall be administered 28 days in advance; for the 14 d time points, injections shall be administered 14 days in advance; and for the 1 d time points, injections shall be administered 24 h in advance. At experimental time point of zero, mice of 1 d 14 d, and 28 d time points are killed for detection, while the mouse of 56 d time point is continued to be observed for additional 28 days. The detailed process is illustrated in FIG. 14.

4. Detection Indicators and Methods
4.1. Safety Evaluation Indicators
4.1.1 General Observation Within 28 days after injection, the experiment animals are observed daily for their activity, feeding and mental state, and weighed once a week. Within 7 days after injection, the experiment animals are observed for their appearance and morphology change of the skin at the local injection site, with or without papules, erythema, scabs, nodules, edema, exudation, etc.; the experiment animals are observed for the tactile sensation of the injection site, with or without hard nodules, masses, and the flatness and other changes of the skin; and the animals are closely observed for their condition and behavioral characteristics, and paid attention to the presence or absence of histological changes caused by vascular embolism, and mental and behavioral abnormalities.

The observation results of the local injection site on the skin are shown in Table 3.

TABLE 3

Effect of recombinant humanized type III collagen on HSF cell growth

| Responses | Irritation score |
|---|---|
| Formation of erythema and scabs | |
| No erythema | 0 |
| Very slight erythema (barely visible) | 1 |
| Clear erythema | 2 |
| Moderate erythema | 3 |
| Severe erythema (purple), with the formation of scabs that cannot perform grading of erythema | 4 |
| Formation of edema | |
| No edema | 0 |
| Slight edema (barely visible) | 1 |
| Clear edema (distinct swelling edges) | 2 |
| Moderate edema (about 1 mm swelling) | 3 |
| Severe edema (swelling exceeding 1 mm and extending beyond a contact area) | 4 |
| Maximum irritation score | 8 |

Other abnormal conditions at the injection site should be recorded and reported.

TABLE 4

Irritation response integral

| Number | | Control group | Experimental group |
|---|---|---|---|
| Animal number (piece) | | 3 | 3 |
| (24 ± 0.1) h | Erythema | 1 | 1 |
| | Edema | 1 | 1 |
| | Total score | 2 | 2 |
| (48 ± 2) h | Erythema | 1 | 1 |
| | Edema | 0 | 0 |
| | Total score | 1 | 1 |

TABLE 4-continued

Irritation response integral

| Number | | Control group | Experimental group |
|---|---|---|---|
| (72 ± 2) h | Erythema | 0 | 0 |
| | Edema | 0 | 0 |
| | Total score | 0 | 0 |
| (120 ± 2) h | Erythema | 0 | 0 |
| | Edema | 0 | 0 |
| | Total score | 0 | 0 |

According to the observed results of the skin local injection site test in Table 4, it can be seen that under the experimental conditions of this example, the recombinant type III humanized collagen microsphere with innovative spatial structure obtained in Example 2 is observed for changes in the skin appearance and morphology of the local injected site within 7 days after injection. Similar to the results of the control group, except for some erythema in the first 2 days after injection, there were no papules, erythema or scabs and nodules, edema, exudation or other reactions on the third day, indicating no significant irritant reaction to the skin.

4.2. Observation and Evaluation of In-Vivo Degradation
4.2.1. Histopathological Evaluation Taking 1 d, 14 d, 28 d, and 56 d after injection as the observation time points, the experimental animals are killed, and the tissue at the injection site is fixed in 10% formalin and then embedded with paraffin for slicing, and the obtained slices are subjected to Hematoxylin-eosin (HE) staining and Sirius Red staining to detect the content of humanized type III collagen.

TABLE 5

Residual rate of humanized type III collagen after injection into mouse skin

| Group | Animal number | Initial injection amount (mg) | Detected value after subtracting blank (mg/ml) | Residual amount (mg) | AV ± ESD | Residual rate |
|---|---|---|---|---|---|---|
| Control group Day 1 | 1 | 1 | 0.0866 | 0.866 | 0.845 ± 0.017 | 100% |
| | 2 | | 0.0836 | 0.836 | | |
| | 3 | | 0.0834 | 0.834 | | |
| Experimental group Day 1 | 13 | 1 | 0.0901 | 0.901 | 0.904 ± 0.005 | 100% |
| | 14 | | 0.0902 | 0.902 | | |
| | 15 | | 0.0911 | 0.911 | | |
| Control group Day 14 | 4 | 1 | 0.0412 | 0.412 | 0.410 ± 0.013 | 48.5% |
| | 5 | | 0.0422 | 0.422 | | |
| | 6 | | 0.0396 | 0.396 | | |
| Experimental group Day 14 | 16 | 1 | 0.0523 | 0.523 | 0.534 ± 0.027 | 58.9% |
| | 17 | | 0.0566 | 0.566 | | |
| | 18 | | 0.0514 | 0.514 | | |
| Control group Day 28 | 7 | 1 | 0.0102 | 0.102 | 0.106 ± 0.005 | 12.5% |
| | 8 | | 0.0112 | 0.112 | | |
| | 9 | | 0.0104 | 0.104 | | |
| Experimental group Day 28 | 19 | 1 | 0.0213 | 0.213 | 0.217 ± 0.005 | 24.1% |
| | 20 | | 0.0224 | 0.224 | | |
| | 21 | | 0.0216 | 0.216 | | |
| Control group Day 56 | 10 | 1 | 0.0002 | 0.002 | 0.002 ± 0.001 | 0.20% |
| | 11 | | 0.0003 | 0.003 | | |
| | 12 | | 0.0001 | 0.001 | | |
| Experimental group Day 56 | 22 | 1 | 0.0013 | 0.013 | 0.013 ± 0.002 | 1.44% |
| | 23 | | 0.0015 | 0.015 | | |
| | 24 | | 0.0011 | 0.011 | | |

The detection results in Table 5 indicate that the residual rate of humanized type III collagen in the tissue at the injection site of the mouse in the experimental group is significantly higher than that in the control group. This confirms that the recombinant humanized type III collagen microsphere with innovative spatial structure obtained from Example 2 exhibits a significant property of prolonging the degradation period in vivo, or promoting the regeneration of its own collagen.

Based on the above Examples, it can be concluded that the present application has, for the first time, obtained cyclizing enzymes and recombinant humanized type III collagen by a genetic engineering bacterial fermentation technique. Under the action of cyclizing enzymes, peptide segments cleaved by the TEV cutting enzyme are linked hand-to-tail to produce a novel cyclized collagen having a three-dimensional spherical structure. The sequence of this protein is not only fully consistent with the partial sequence of natural human type III collagen, possessing all the biological activities of type III collagen, but also exhibits excellent water solubility and biocompatibility. Furthermore, through alterations in its spatial structure, the degradation period of the protein is significantly extended, achieving the goal of small protein with great efficacy.

It should be noted that, for those skilled in the art, the present application is not limited to the details of the exemplary Examples described above. Rather, the application can be implemented in other specific forms without departing from the spirit or essential characteristics of the application. Therefore, the examples should be viewed as illustrative and non-limiting from either point of view. Furthermore, it should be understood that although the present specification has been described in terms of specific embodiments, it does not include only one technical solution. The description provided herein is merely for clarity, and those skilled in the art should consider the specification as a whole. The technical solutions in the examples may be appropriately combined to form other embodiments that can be understood by those skilled in the art.

What is claimed is:

1. A process of preparing a recombinant humanized type III collagen microsphere with innovative spatial structure, comprising:

designing a gene sequence of humanized type III collagen as shown in SEQ NO: 3, and constructing an expression vector pET28a-MBP-His6-ENLYFQ;

inserting the designed gene sequence of humanized type III collagen into the expression vector to form a recombinant plasmid, and then introducing the recombinant plasmid into an engineering bacterium for fermentation expression; and extracting a target protein expressed by the recombinant plasmid, treating with Tobacco Etch Virus (TEV) cutting enzyme, and cyclizing with Butelase ligase, and obtaining the recombinant humanized type III collagen microsphere with innovative spatial structure;

wherein the collagen microsphere is formed solely by cyclization of two peptide segments having amino acid sequences with 100% coverage with the amino acid sequence of natural human type III collagen; and the collagen microsphere has an amino acid sequence as shown in SEQ NO: 1, and is formed by cyclization of the two peptide segments by head-to-tail connection, each peptide segment having the amino acid sequence as shown in SEQ NO: 2.

2. The process of preparing the recombinant humanized type III collagen microsphere with innovative spatial structure according to claim 1, wherein the process comprises the following steps:

SA1: inoculating the engineering bacterium where the recombinant plasmid is introduced into a culture medium and incubating under shaking at 32-37° C. for 20-24 h to obtain a seed solution of expression bacterium;

SA2: transferring the seed solution of expression bacterium to a fresh culture medium at an inoculation amount of 5% to 15% by volume concentration, and continuing fermentation under conditions of 32-37° C.;

SA3: after a density of the engineering bacterium in a fermentation broth reaches a predetermined concentration, adding an inducer, and inducing a target protein for expression at 37° C.;

SA4: after completion of fermentation expression, collecting fermentation products, centrifuging to obtain a pellet, performing ultrasonication on ice and then denaturation and renaturation, and conducting protein purification to obtain the target protein;

SA5: resuspending the obtained target protein in a TEV cutting enzyme solution, and incubating and conducting an enzymatic digestion reaction under conditions of pH 6.0-9.0 and 29-34° C. to obtain peptide segments capable of being cyclized;

SA6: adding Butelase ligase to an enzymatically digested protein solution, and controlling conditions of enzymatic ligation to pH 5.0-7.0 and a reaction temperature of 37-45° C., and obtaining cyclized recombinant humanized type III collagen; and SA7: collecting the cyclized recombinant humanized type III collagen for purification, and obtaining the recombinant humanized type III collagen microsphere with innovative spatial structure.

3. The process of preparing the recombinant humanized type III collagen microsphere with innovative spatial structure according to claim 1, wherein the engineering bacterium comprises any one of *Escherichia coli, Bacillus subtilis*, or yeast.

4. The process of preparing the recombinant humanized type III collagen microsphere with innovative spatial structure according to claim 3, wherein the TEV cutting enzyme is obtained by inserting His-TEVp recombinant protein gene into a pET-21a vector to obtain a recombinant plasmid and then introducing the recombinant plasmid into the engineering bacterium for expression.

5. The process of preparing the recombinant humanized type III collagen microsphere with innovative spatial structure according to claim 4, wherein the Butelase ligase has a gene sequence as shown in SEQ NO: 7 and is obtained by integrating its gene sequence into a gene expression site of the engineering bacterium for expression using Clustered Regularly Interspaced Short Palindromic Repeats (CRISPR)/Cas9 technology.

6. The process of preparing the recombinant humanized type III collagen microsphere with innovative spatial structure according to claim 1, wherein the culture medium for fermentation expression is a M9 culture medium, and the inducer used is Isopropyl β-D-Thiogalactopyranoside (IPTG), and a concentration of the inducer added in a culture system is in a range of 0.1 mM to 1 mM.

7. A process of preparing a recombinant humanized type III collagen microsphere with innovative spatial structure, comprising:
  designing a gene sequence of humanized type III collagen as shown in SEQ NO: 3, constructing an expression vector pET28a-MBP-His6-ENLYFQ, and inserting the designed gene sequence of humanized type III collagen into the expression vector to form a recombinant plasmid;
  introducing the recombinant plasmid and Tobacco Etch Virus (TEV) cutting enzyme gene and Butelase ligase gene together into an engineering bacterium for fermentation expression; and
  completing a process of enzymatic digestion and cyclization of a target protein expressed by the recombinant plasmid within the engineering bacterium, extracting and purifying the target protein to obtain the recombinant humanized type III collagen microsphere with innovative spatial structure;
  wherein the collagen microsphere is formed solely by cyclization of two peptide segments having amino acid sequences with 100% coverage with the amino acid sequence of natural human type III collagen; and the collagen microsphere has an amino acid sequence as shown in SEQ NO: 1, and is formed by cyclization of the two peptide segments by head-to-tail connection, each peptide segment having the amino acid sequence as shown in SEQ NO: 2.

8. The process of preparing the recombinant humanized type III collagen microsphere with innovative spatial structure according to claim 7, wherein the process comprises the following steps:
  SB1: introducing the recombinant plasmid containing the designed gene sequence of humanized type III collagen and the TEV cutting enzyme gene into the engineering bacterium that has integrated with the Butelase ligase gene; inoculating the engineering bacterium into a culture medium and incubating under shaking at a condition of 32-37° C. for 20-24 h to obtain a seed solution of expression bacterium;
  SB2: transferring the seed solution of expression bacterium to a fresh culture medium at an inoculation amount of 5% to 15% by volume concentration, and continuing fermentation under the condition of 32-37° C.;
  SB3: when a density of the engineering bacterium in a fermentation broth reaches a predetermined concentration, adding an inducer, and inducing target protein expression at 37° C. and conducting enzymatic digestion and cyclization; and
  SB4: after completion of fermentation expression, collecting fermentation products, centrifuging to obtain a pellet, performing ultrasonication on ice and then denaturation and renaturation, and conducting protein purification to obtain the recombinant humanized type III collagen microsphere with innovative spatial structure.

9. The process of preparing the recombinant humanized type III collagen microsphere with innovative spatial structure according to claim 7, wherein the engineering bacterium comprises any one of *Escherichia coli, Bacillus subtilis*, or yeast.

10. The process of preparing the recombinant humanized type III collagen microsphere with innovative spatial structure according to claim 9, wherein the TEV cutting enzyme gene is His-TEVp recombinant protein gene and is inserted into a pET-21a vector to form a recombinant plasmid, and then the formed recombinant plasmid is introduced into an engineering bacterium along with the recombinant plasmid containing the target protein for expression.

11. The process of preparing the recombinant humanized type III collagen microsphere with innovative spatial structure according to claim 10, wherein the Butelase ligase has a nucleotide sequence as shown in SEQ NO: 7, and is integrated into a gene expression site of the engineering bacterium for expression using Clustered Regularly Interspaced Short Palindromic Repeats (CRISPR)/Cas9 technology.

12. The process of preparing the recombinant humanized type III collagen microsphere with innovative spatial structure according to claim 7, wherein the culture medium for fermentation expression is a M9 culture medium, and the inducer used is Isopropyl β-D-Thiogalactopyranoside (IPTG), and a concentration of the inducer added in a culture system is in a range of 0.1 mM to 1 mM.

\* \* \* \* \*